United States Patent [19]
Branson et al.

[11] Patent Number: 5,937,189
[45] Date of Patent: Aug. 10, 1999

[54] OBJECT ORIENTED FRAMEWORK MECHANISM FOR DETERMINING CONFIGURATION RELATIONS

[75] Inventors: Michael John Branson; William Robert Taylor, both of Rochester, Minn.

[73] Assignee: International Business Machines Corporation, Armonk, N.Y.

[21] Appl. No.: 08/748,144

[22] Filed: Nov. 12, 1996

[51] Int. Cl.⁶ .................................................. G06F 9/44
[52] U.S. Cl. ............................. 395/701; 395/702
[58] Field of Search .................. 395/701, 702, 395/703; 707/103

[56] References Cited

U.S. PATENT DOCUMENTS

| | | | |
|---|---|---|---|
| 4,943,932 | 7/1990 | Lark et al. | 364/513 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |
| 5,276,775 | 1/1994 | Meng | 395/55 |
| 5,287,447 | 2/1994 | Miller et al. | 395/157 |
| 5,293,470 | 3/1994 | Birch et al. | 395/135 |
| 5,297,283 | 3/1994 | Kelly, Jr. et al. | 395/650 |
| 5,315,703 | 5/1994 | Matheny et al. | 395/164 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Tobias, II et al. | 395/650 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,560,005 | 9/1996 | Hoover et al. | 395/600 |
| 5,630,131 | 5/1997 | Palevich et al. | 395/701 |
| 5,732,270 | 3/1998 | Foody et al. | 395/683 |
| 5,768,510 | 6/1998 | Gish | 395/200.33 |

OTHER PUBLICATIONS

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

(List continued on next page.)

*Primary Examiner*—Tariq R. Hafiz
*Attorney, Agent, or Firm*—Martin & Associates, LLC; Derek P. Martin

[57] ABSTRACT

An object oriented framework mechanism provides a straightforward and convenient way to implement a system determining configuration relations for any type of system that needs to be configured. The configuration relations framework includes several core classes and several classes that are extensible according to the needs of the user. The core classes and class relationships define the core function of the framework mechanism. Extensible classes are extended by a programmer to implement a desired configuration environment. The framework provides consistent programmer interfaces over a wide variety of different production environments, which greatly enhances programmer efficiency and which makes the resultant code much easier to maintain.

54 Claims, 35 Drawing Sheets

OTHER PUBLICATIONS

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract of WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract from WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract for WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract fpr WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Applicaton No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Stimulation in a Very High–Level Pictorial Object–Oriented".

Inspec Abstract No. C9504–7460–042, Coleman et al., "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101—An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 461931, from Islan et al, 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al, 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement".

Inspec Abstract No. 4534334, from Campbell et al., 1991, "A Technique for Documenting the Framework of an Object-Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Proramming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abastract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experiences with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al, 1990, "DEMOM–A Description Based Media Object Data Model".

Inspec Abstract No. C91072016, from a Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985; "PROMPTER: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

Containment Unit
(from Containment
Unit Mechanism)
adjust_temp()

FIG. 6

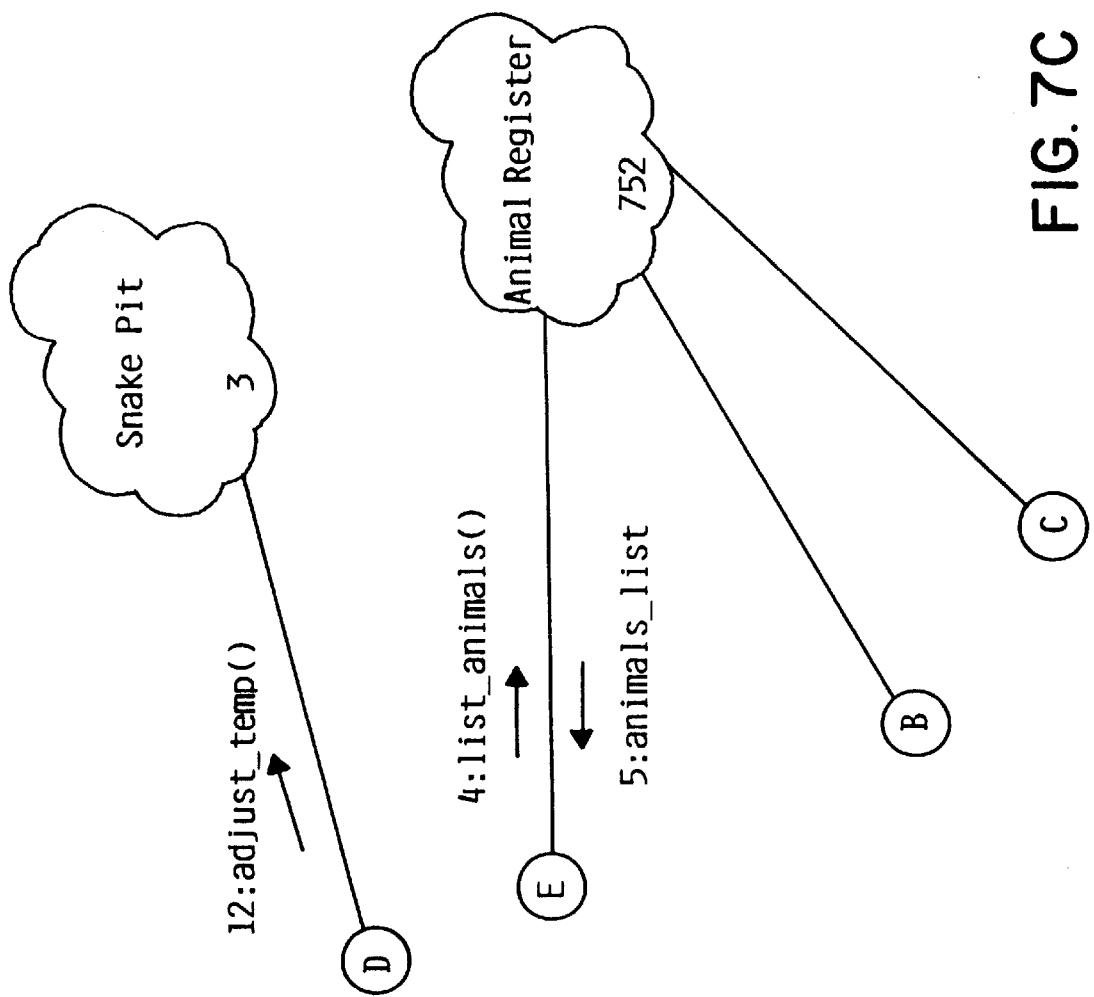

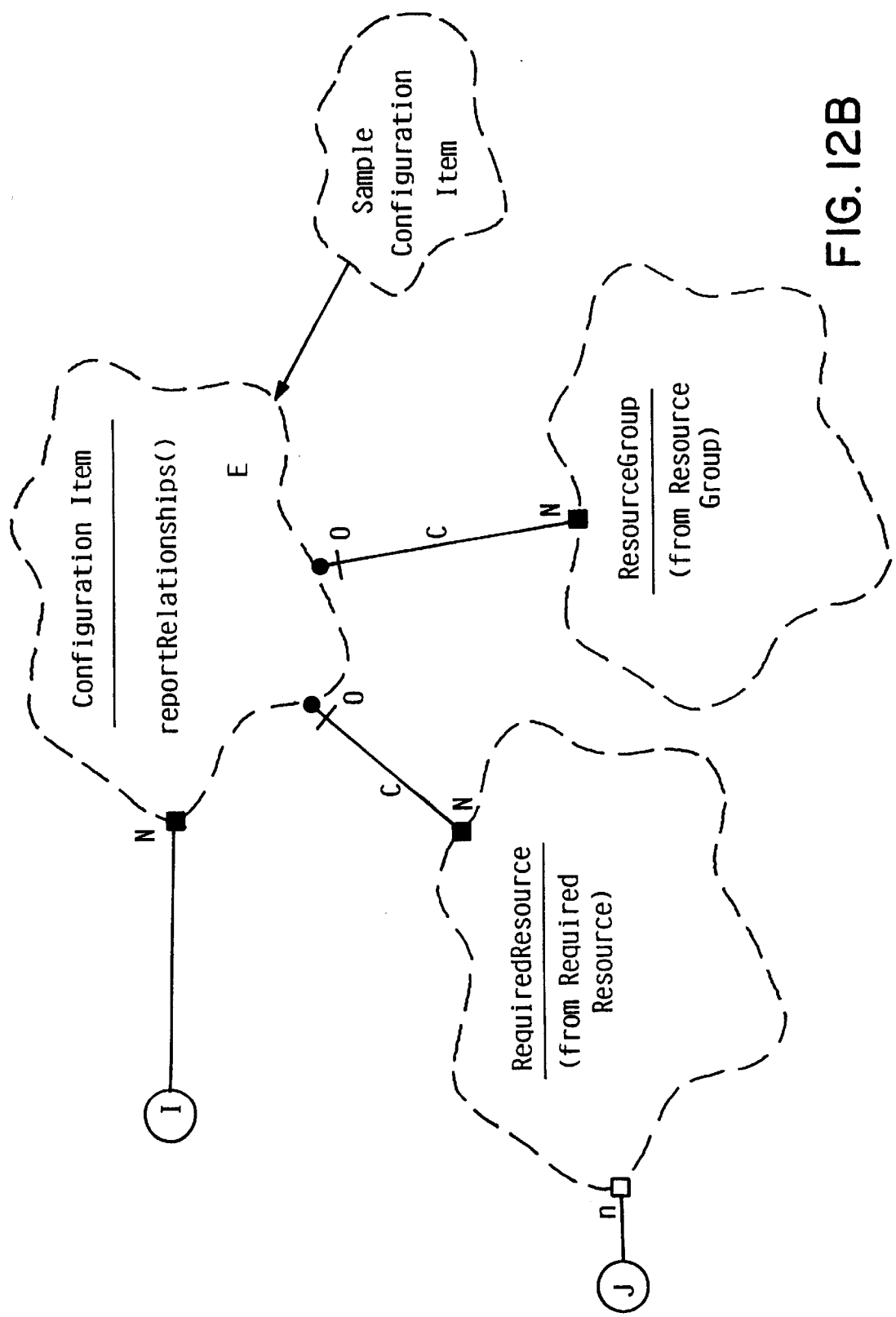

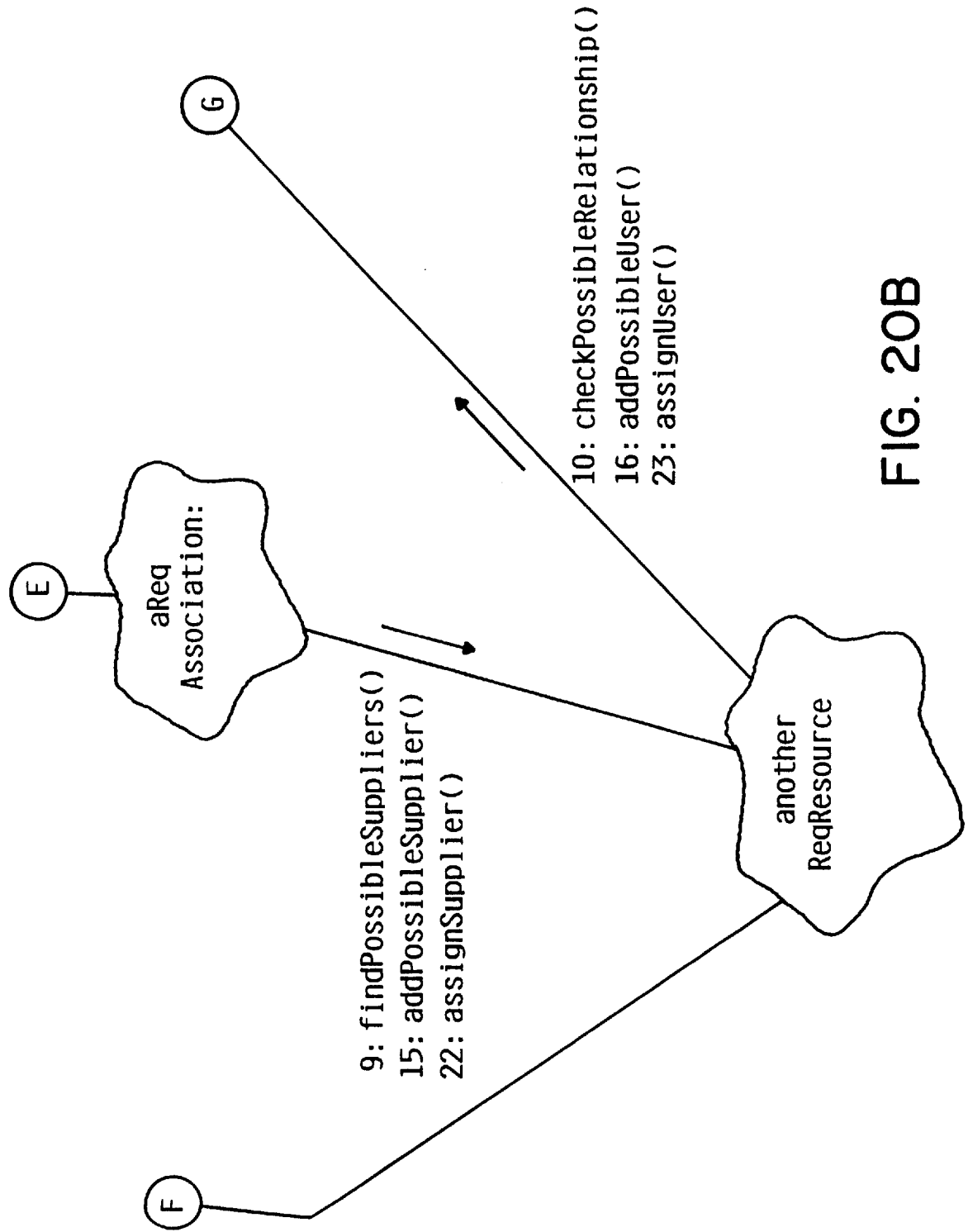

OBJECT ORIENTED FRAMEWORK MECHANISM FOR DETERMINING CONFIGURATION RELATIONS

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices that are used in a host of different applications. One such application is in the domain of configuration, which broadly applies to any problem where resources need to be allocated and configured. Examples of common configuration problems include the allocation of facilities at a convention, the layout of chips on a circuit board, and the configuration of a computer product in a computer manufacturing facility. In a configuration environment, there exists the need to determine configuration relationships between any two or more items in order to be able to configure the desired system.

In the past, computers have been programmed with software to solve a variety of different configuration problems. Configuration software has typically been custom-developed according to the specific needs of a particular configuration environment. While the overall performance parameters of different configuration environments may differ considerably, one function that must be performed in all configuration environments is determining the relationships between resources or items. However, the differences in prior art systems have precluded reusing very much code from one configuration environment to the next. Each different configuration application typically has its own custom, dedicated way of determining configuration relations that is not easily adapted to any new or different application. Without a mechanism that can be readily customized and extended to determine configuration relations in a particular configuration environment, the time required to program and maintain configuration software will be excessively long and expensive.

SUMMARY OF THE INVENTION

According to the present invention, an object oriented framework mechanism for determining configuration relations provides an infrastructure that embodies the steps necessary to determine configuration relations and a mechanism to extend the framework to fit a particular configuration environment. Certain core functions are provided by the framework, which interact with extensible functions provided by the framework user. The architecture of the framework allows a developer to determine the conditions and parameters that apply to the configuration environment with an interface that is consistent regardless of the specific combination of parameters specified in the configuration environment. The extensible functions allow new configuration environments to be easily implemented using the framework. The framework thus allows a common programming interface for determining configuration relations using the framework, which may be easily customized to include new or changed parameters. The framework greatly simplifies the programmer's job of developing code to determine configuration relations by providing a common programming interface, and by providing established classes that may be easily extended to implement the desired configuration environment.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

BRIEF DESCRIPTION OF THE DRAWINGS

FIGS. 2 through 6 are class diagrams for the example framework mechanism of FIG. 1;

DESCRIPTION OF THE PREFERRED EMBODIMENTS

Overview—Object-Oriented Technology

Figure 1:
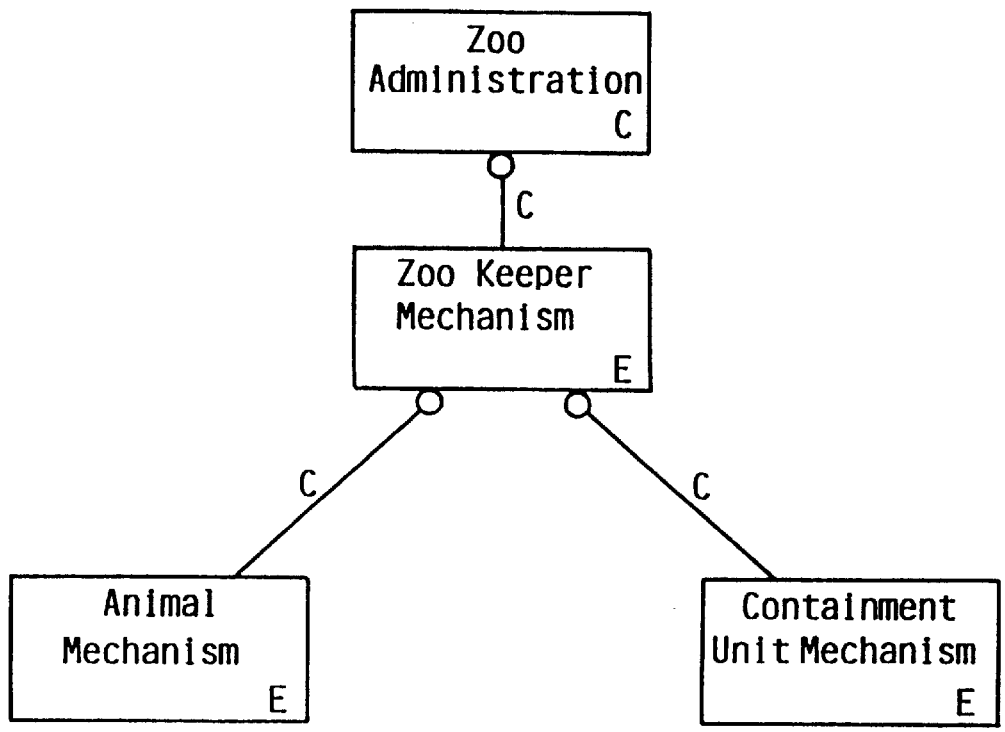
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF Is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 40–45). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
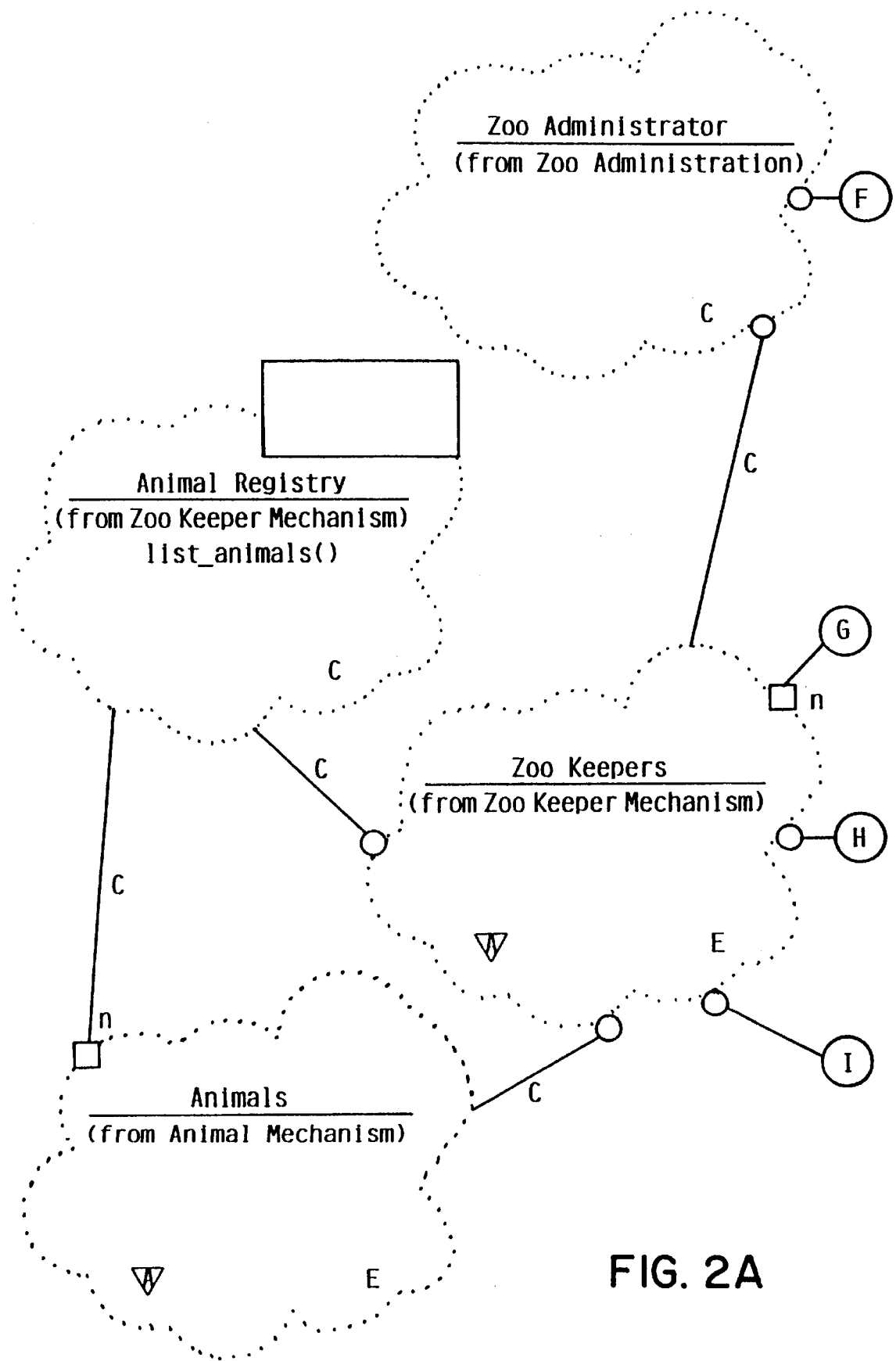
Figure 2B:
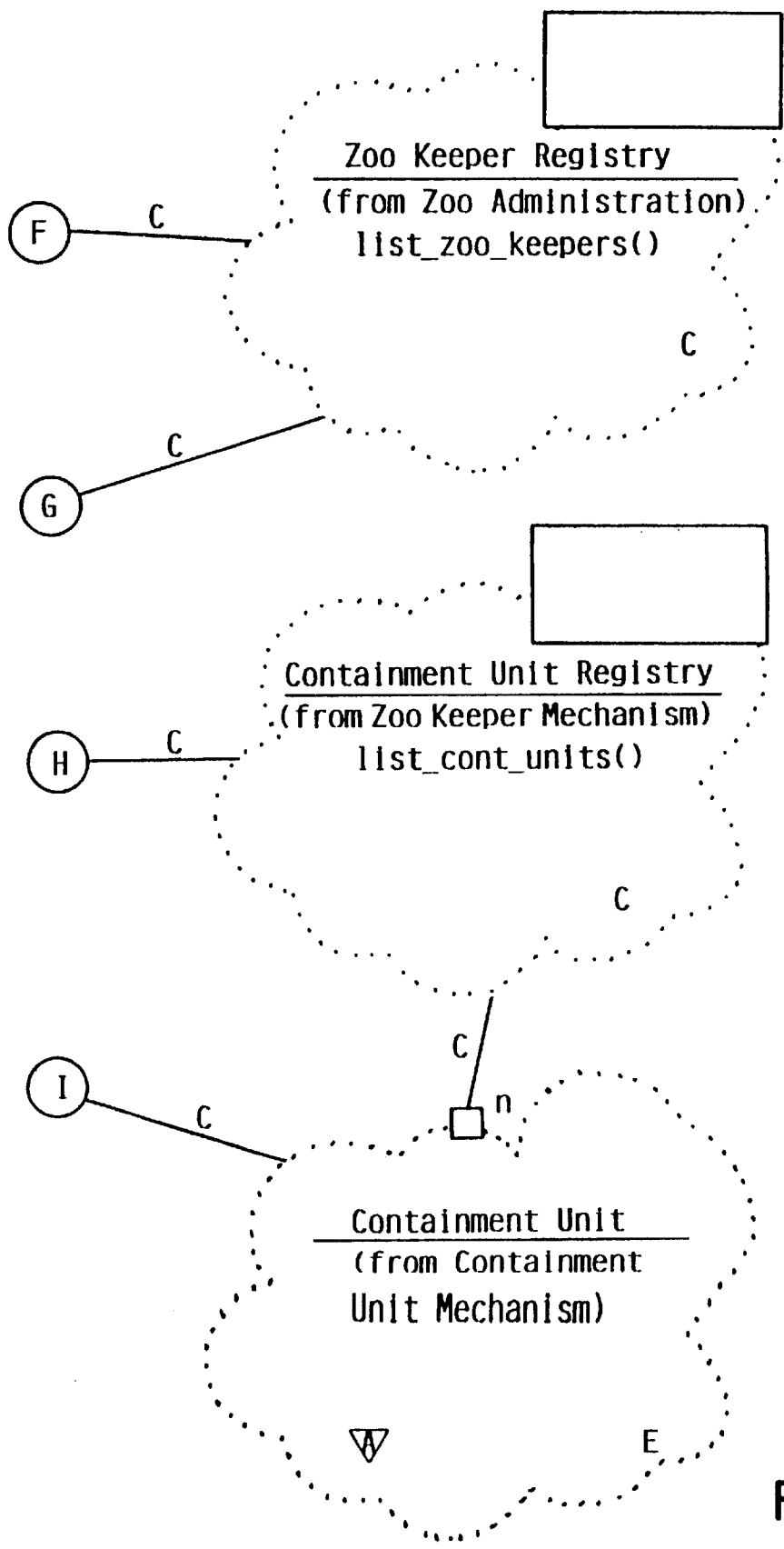

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
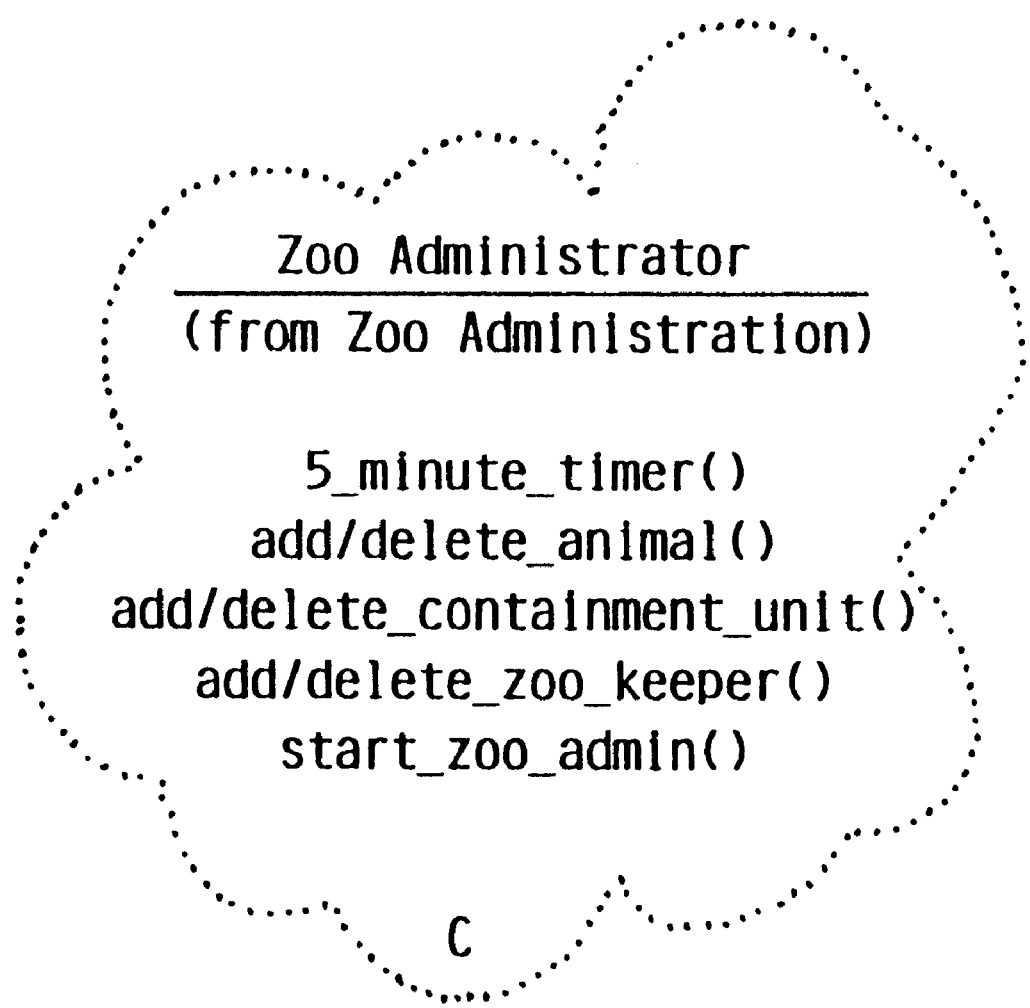

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
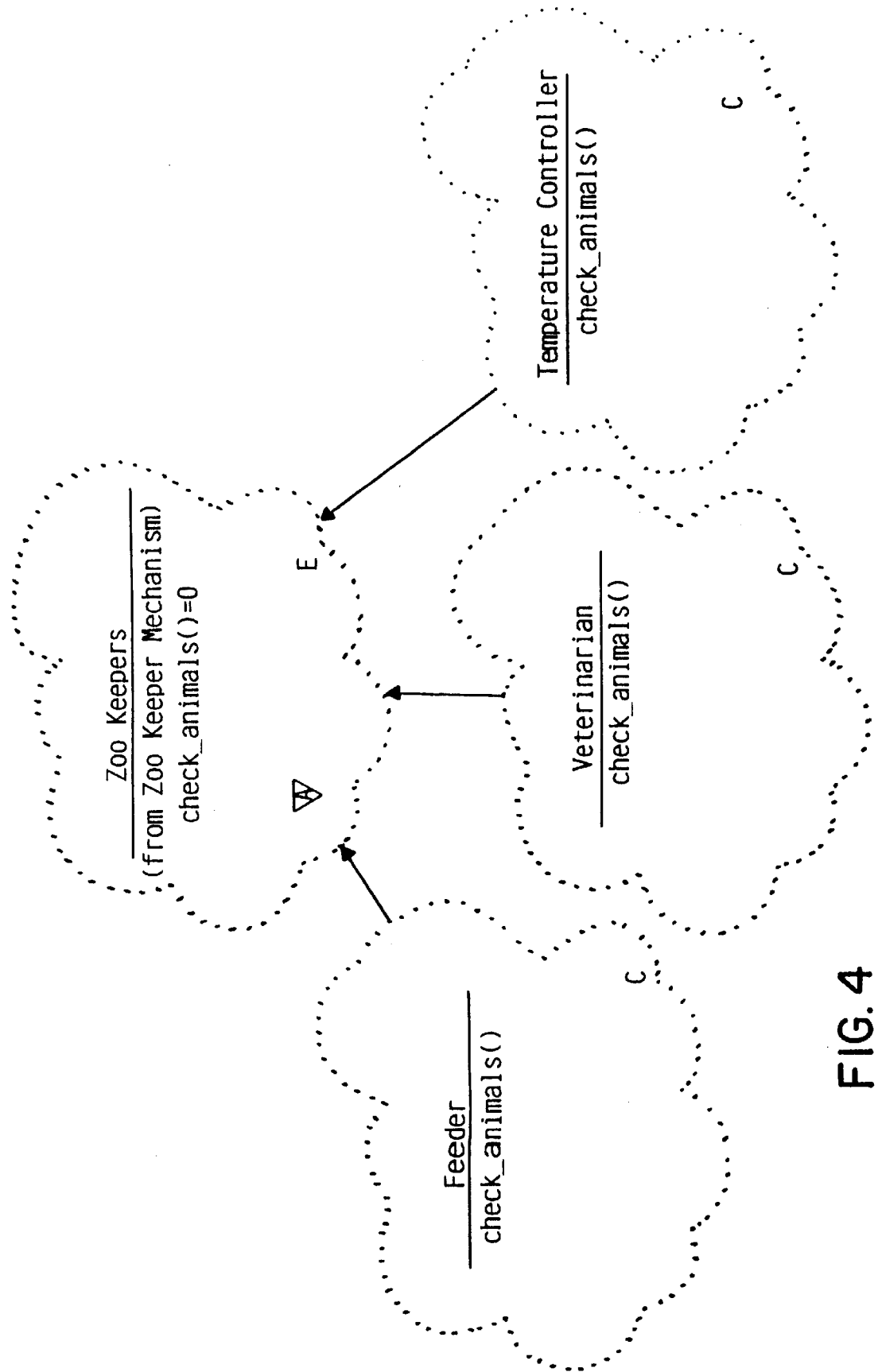

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
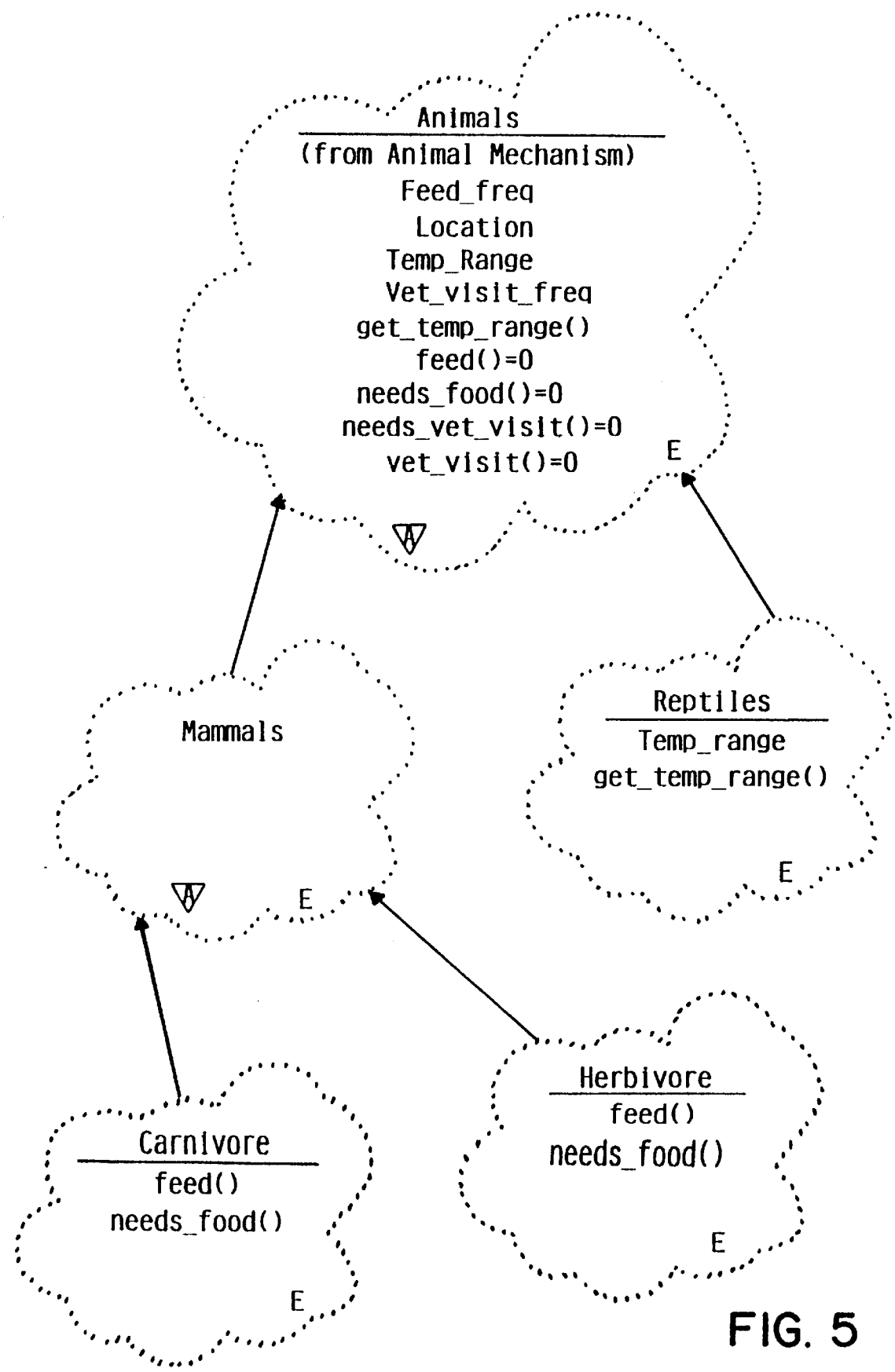

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How The ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
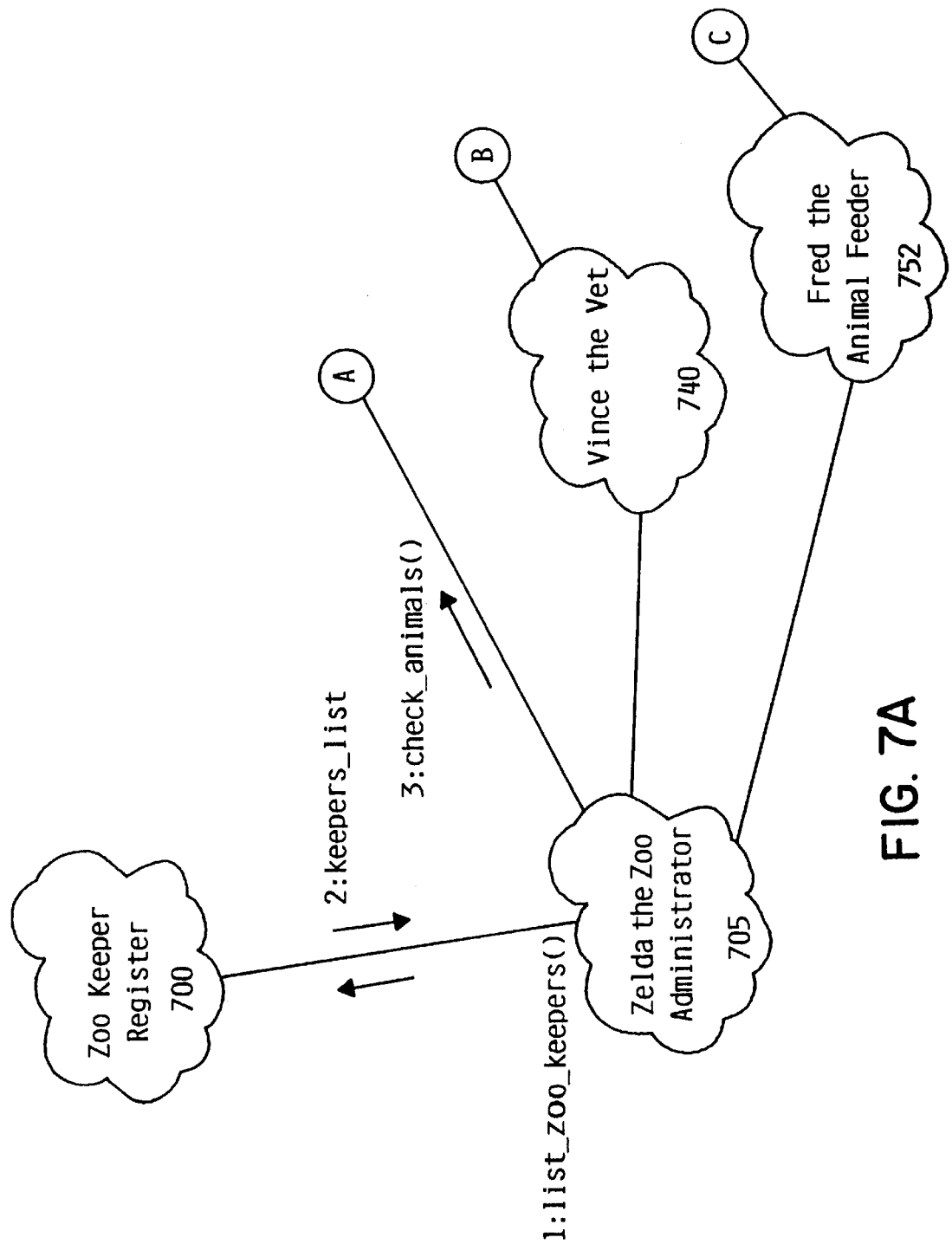
FIG. 7 is an object diagram for the example framework mechanism of FIGS. 1 through 6.
Figure 7B:
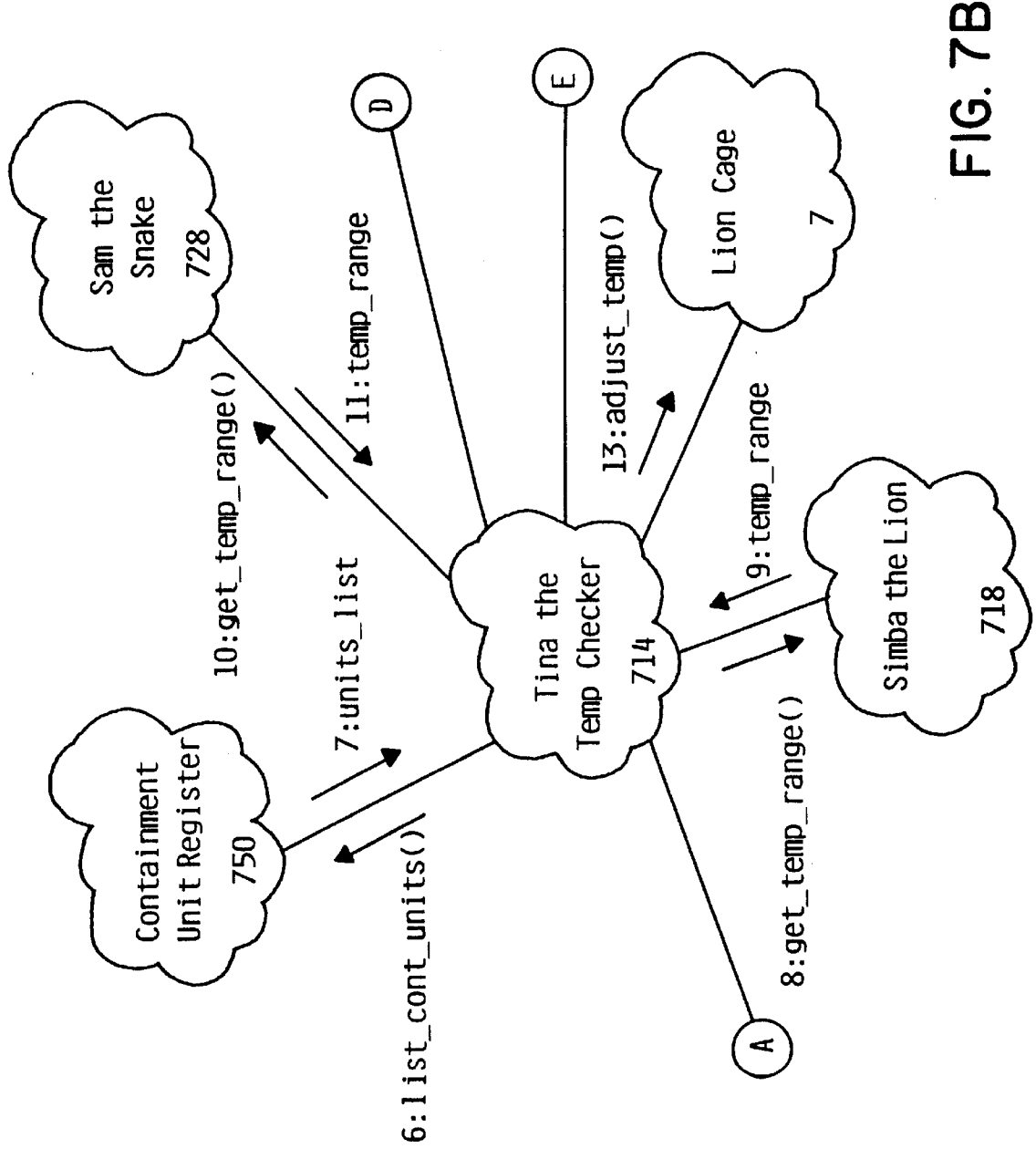

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust_temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
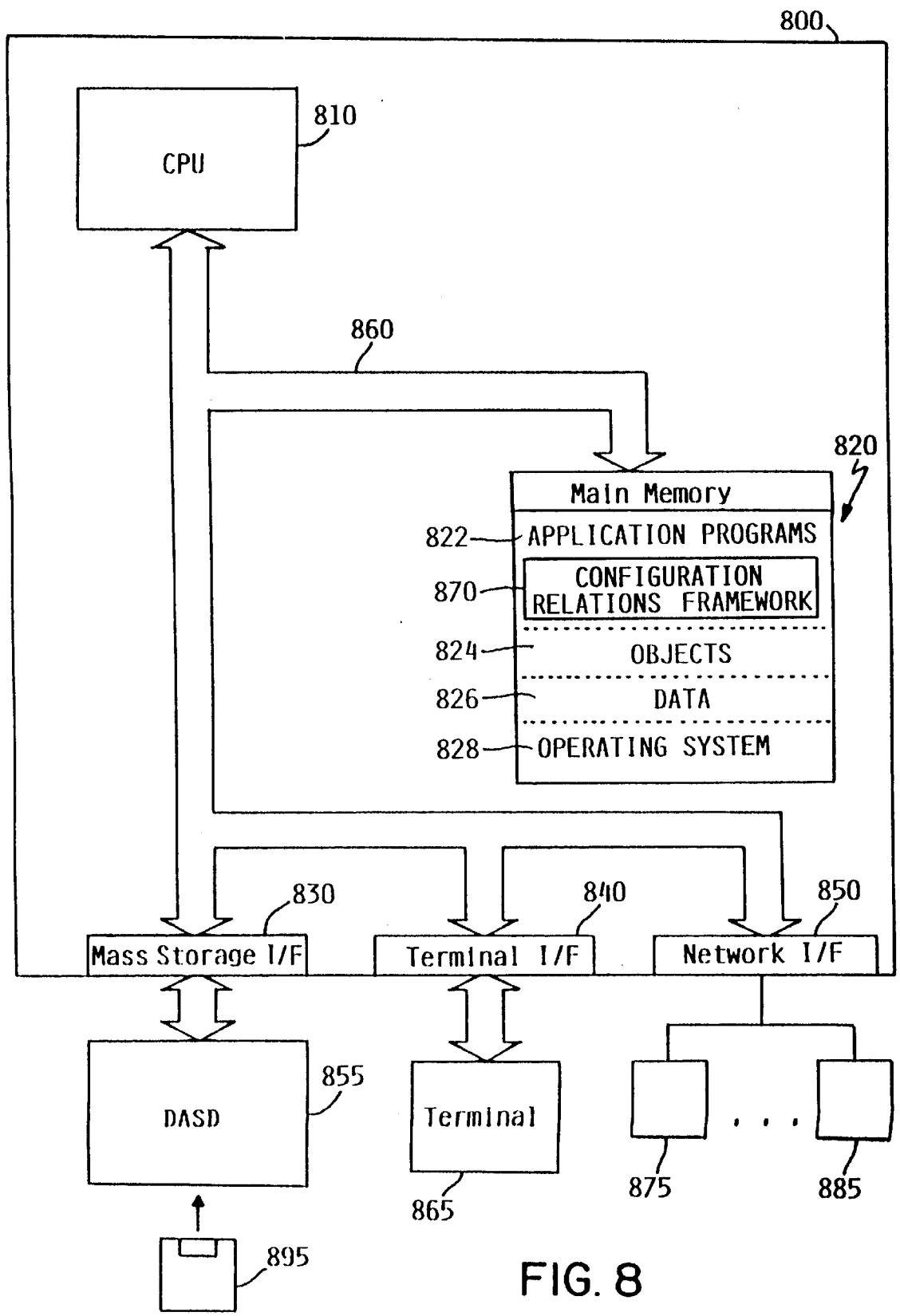
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "computer system memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include a configuration relations framework mechanism 870, which is preferably an object oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

Configuration Relations Framework Mechanism Of The Present Invention

The configuration relations framework mechanism 870 disclosed herein provides an architecture for determining configuration relations among multiple resources or "configuration items" in a system that needs to be configured. Extending the framework to determine configuration relations in a specific environment defines a "configuration environment." For example, extending the framework to determine the configuration relations between resources in setting up (i.e., configuring) a convention site creates a configuration environment that is tailored to that specific task.

In the context of framework mechanism 870, configuration items may be related as "users" and "suppliers". For example, in a system that determines the configuration relations between components in a computer system, a circuit card and a card slot may be related. A circuit card is a user of a card slot, while the card slot is a supplier of the resource that the circuit card needs, namely, an empty slot. Links in the opposite direction may also be made. In other words, a card slot could be related as the user of a circuit card, while the circuit card is the supplier of the resource the slot needs, namely, a card to fill its slot. The concepts of users and suppliers herein generally determine the relationships among configuration items.

By providing framework mechanism 870 within computer system 800 to determine configuration relations, a uniform interface for determining configuration relations in any environment may be developed. Framework mechanism 870 may replace all of the proprietary systems for determining configuration relations that are currently used. This would allow a common programmer interface for virtually any system that requires a determination of configuration relations. This common interface would greatly ease the burden of programming and maintaining custom configuration systems. Thus, one of the primary benefits of the framework disclosed herein is the capability to determine configuration relationships using a simple, easy to use interface defined by the framework.

Figure 9:
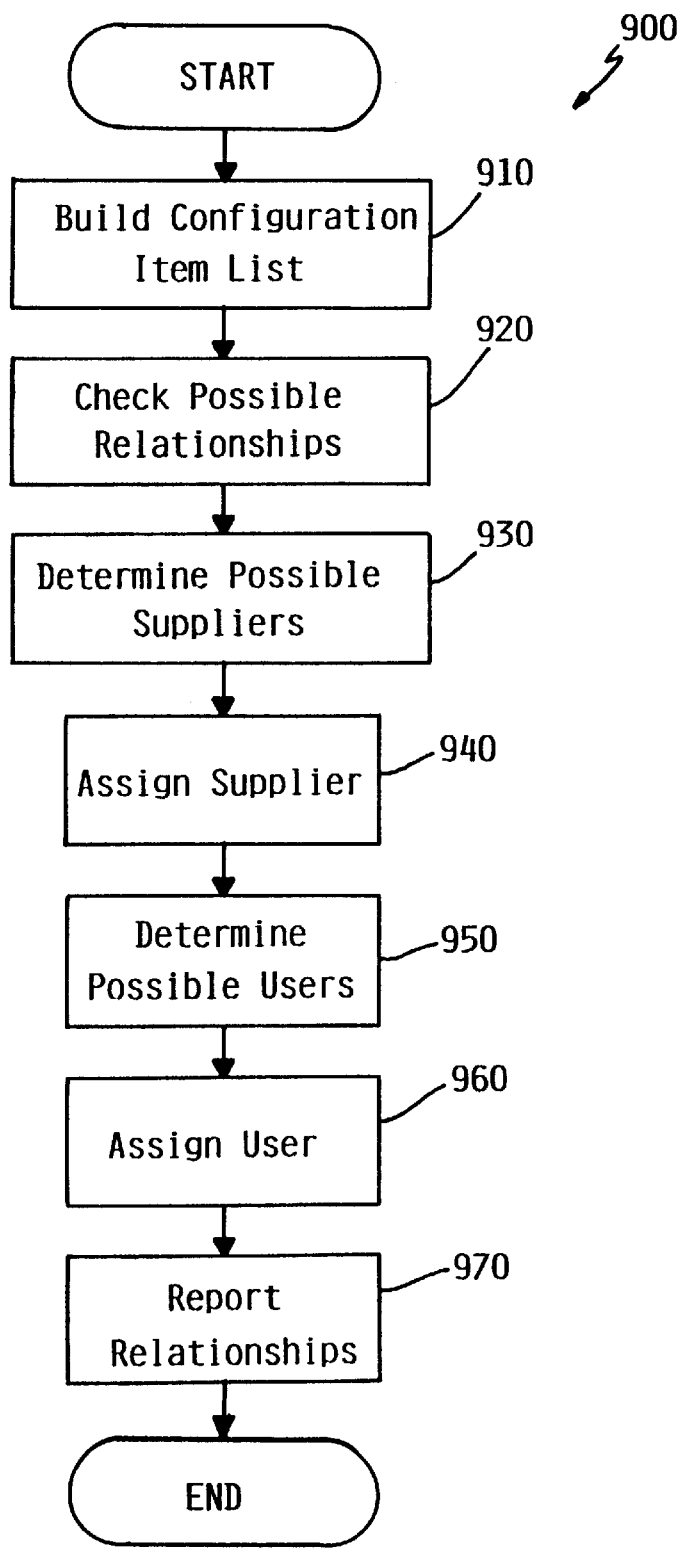
FIG. 9 is a flow diagram showing steps in accordance with the preferred embodiment to perform core functions of the framework mechanism.

Referring to FIG. 9, an example of a configuration relations framework 870 in accordance with the preferred embodiment performs steps that comprise a method 900 for determining the relationship between configuration items in a system. The first step is to build the configuration item list (step 910). A configuration item is an individual item within a configuration environment (e.g., a booth location on a convention center floor). The configuration item list is the list of individual configuration items that apply to this particular configuration (e.g., the list of all booth locations for a particular convention center). The step 910 of building the configuration item list may include substeps such as creating an empty configuration item list, and filling the list from a master item list that contains all possible configuration items. Building the configuration item list creates a comprehensive list of all configuration items in a particular configuration environment. Once the configuration item list is built, method 900 then checks the possible relationships between the items in the configuration item list (step 920). Checking the possible relationships involves determining which relationships might potentially exist among the configuration items. Checking the possible relationships essentially cuts down the number of possible combinations of configuration items by eliminating all combinations that are not possible relationships.

Next, method 900 determines possible suppliers for the configuration items in the configuration item list (step 930). Not all relationships will indicate a possible supplier, so the list is further reduced to indicate the number of configuration items that have possible relationships that are also possible suppliers. The result is a list of possible suppliers for the configuration items. For each configuration item, one of its possible suppliers is selected, and assigned to the configuration item (step 940).

The next step is to determine the possible users for each configuration item (step 950). This is done by taking the configuration items in the configuration item list that have possible relationships (i.e., the output of step 920) and determining from this list which are possible users (step 950). For each configuration item, one of its possible users is selected, and assigned to the configuration item (step 960). At this point the relationships between configuration items has been determined, and the results are reported to the program that called the framework mechanism 870 (step 970).

The fact that the preferred embodiment of the framework is object oriented allows the user of the framework to easily define the needed functions by subclassing from the classes defined within the framework using known object oriented programming environments, such as C++. The preferred embodiment of the present invention is an object oriented configuration relations framework. While many different designs and implementations are possible, one suitable example of an object oriented configuration relations framework is disclosed below to illustrate the broad concepts of the present invention.

Class Definitions

Figure 10:
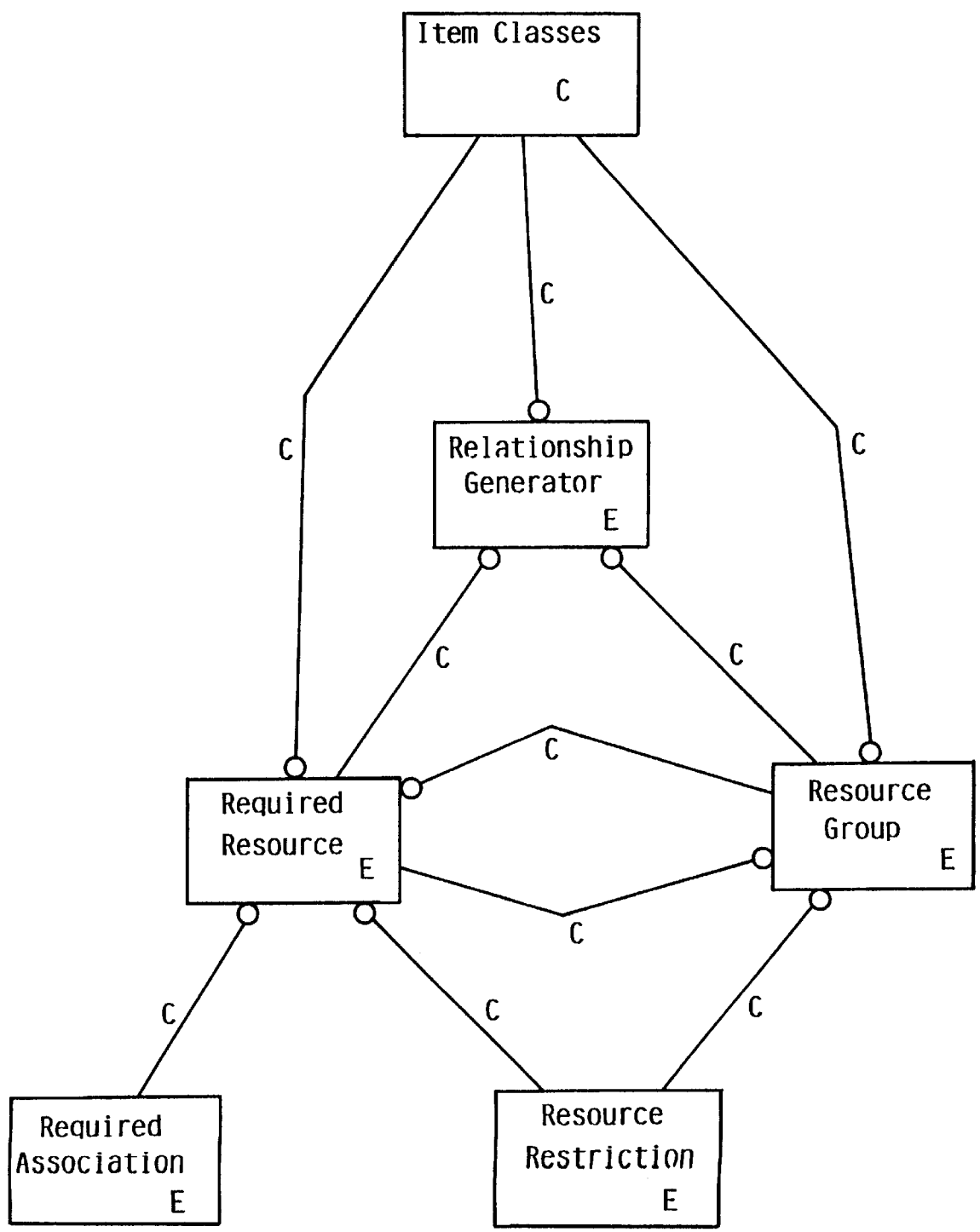
FIG. 10 is a category diagram of a framework mechanism constructed in accordance with the teachings of the preferred embodiment.
Figure 11A:
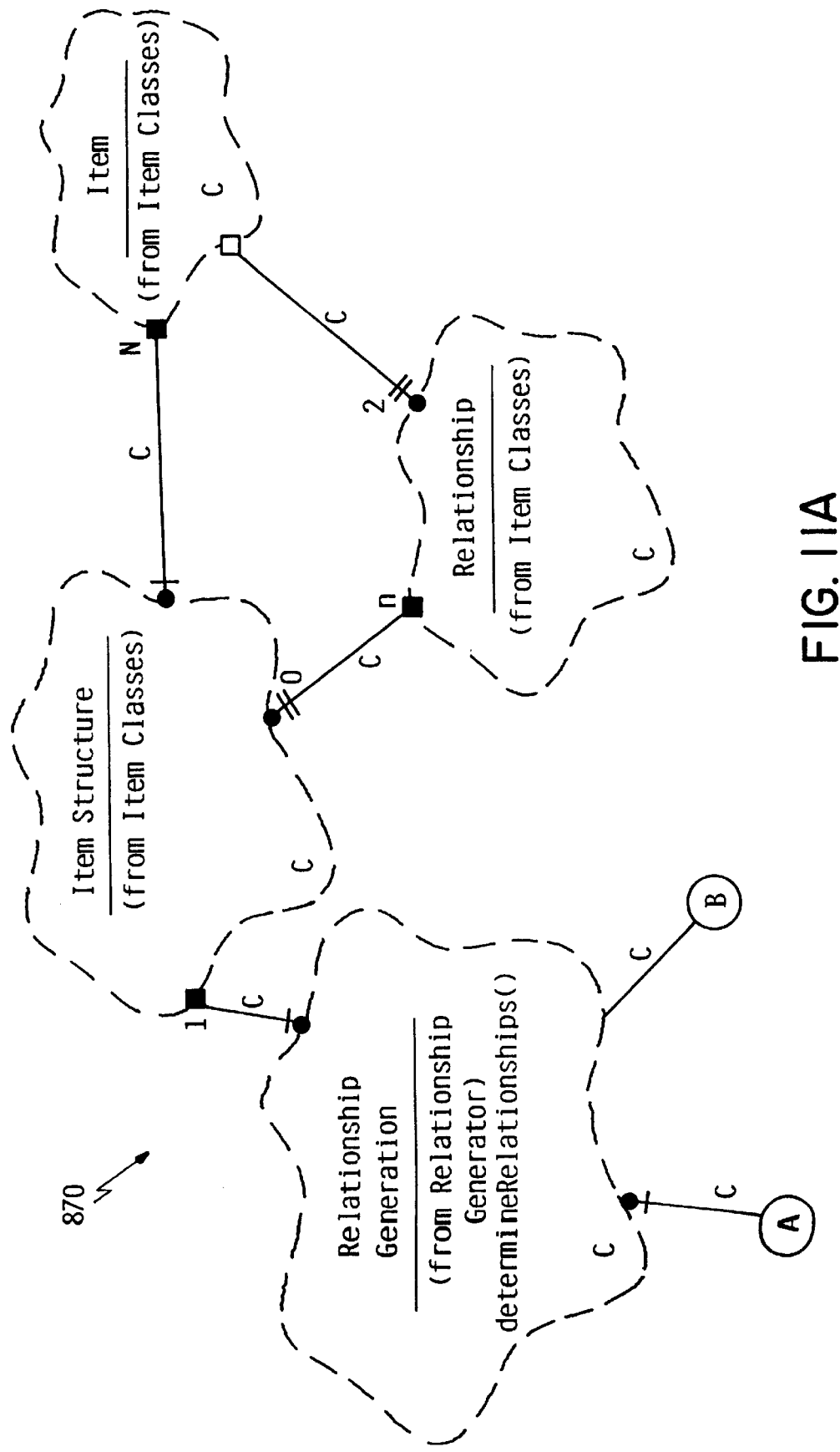
FIGS. 11–17 are class diagrams of a framework mechanism constructed in accordance with the teachings of the preferred embodiment.
Figure 11B:
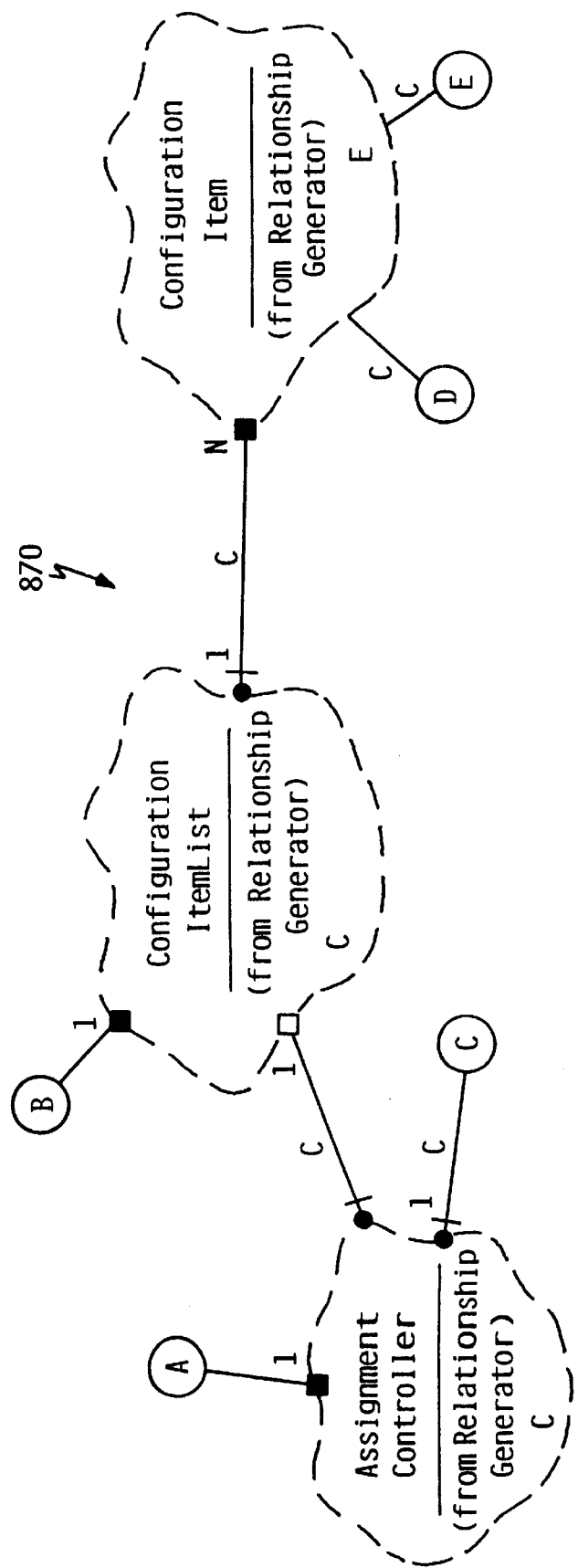
Figure 11C:
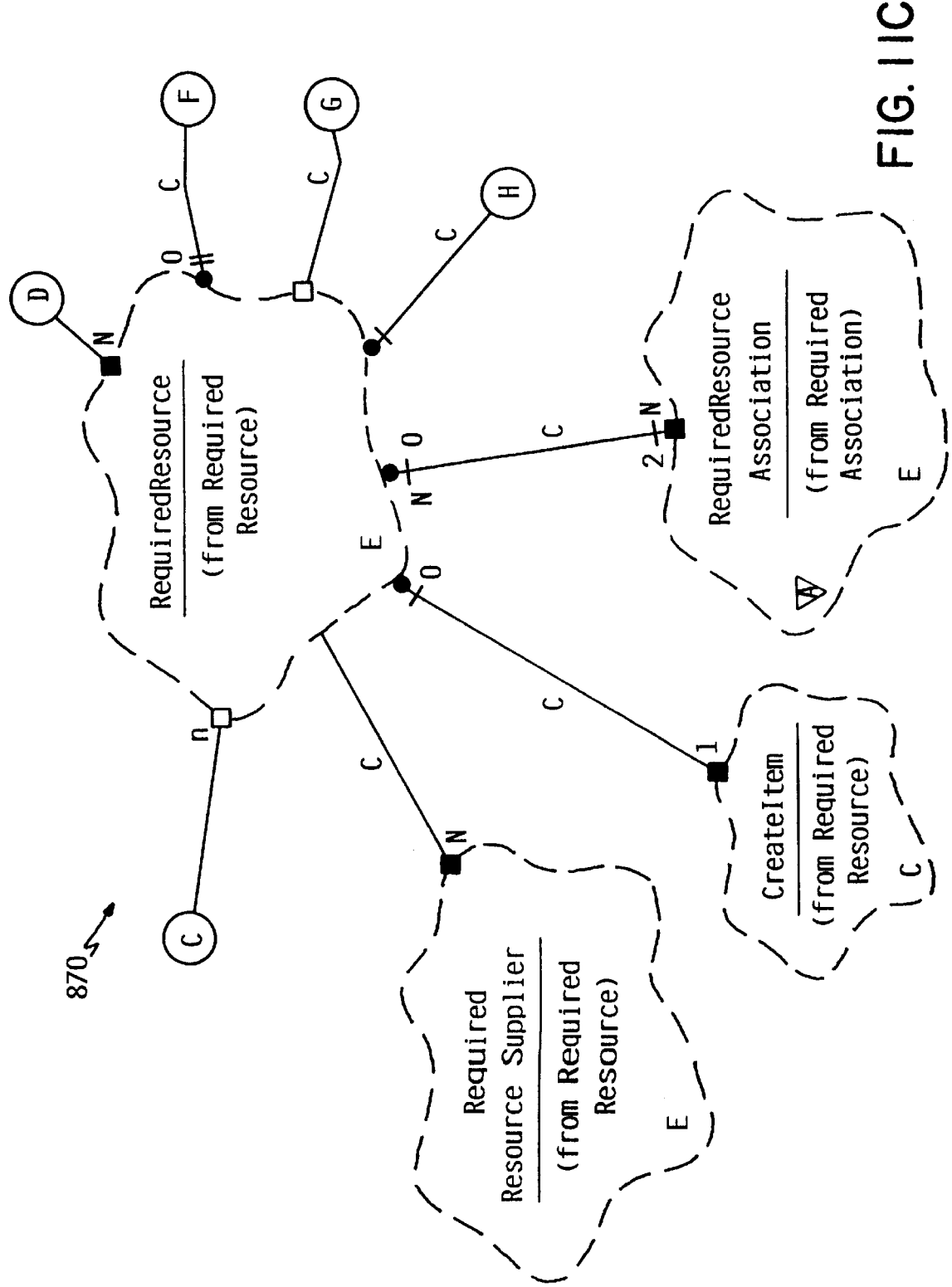
Figure 11D:
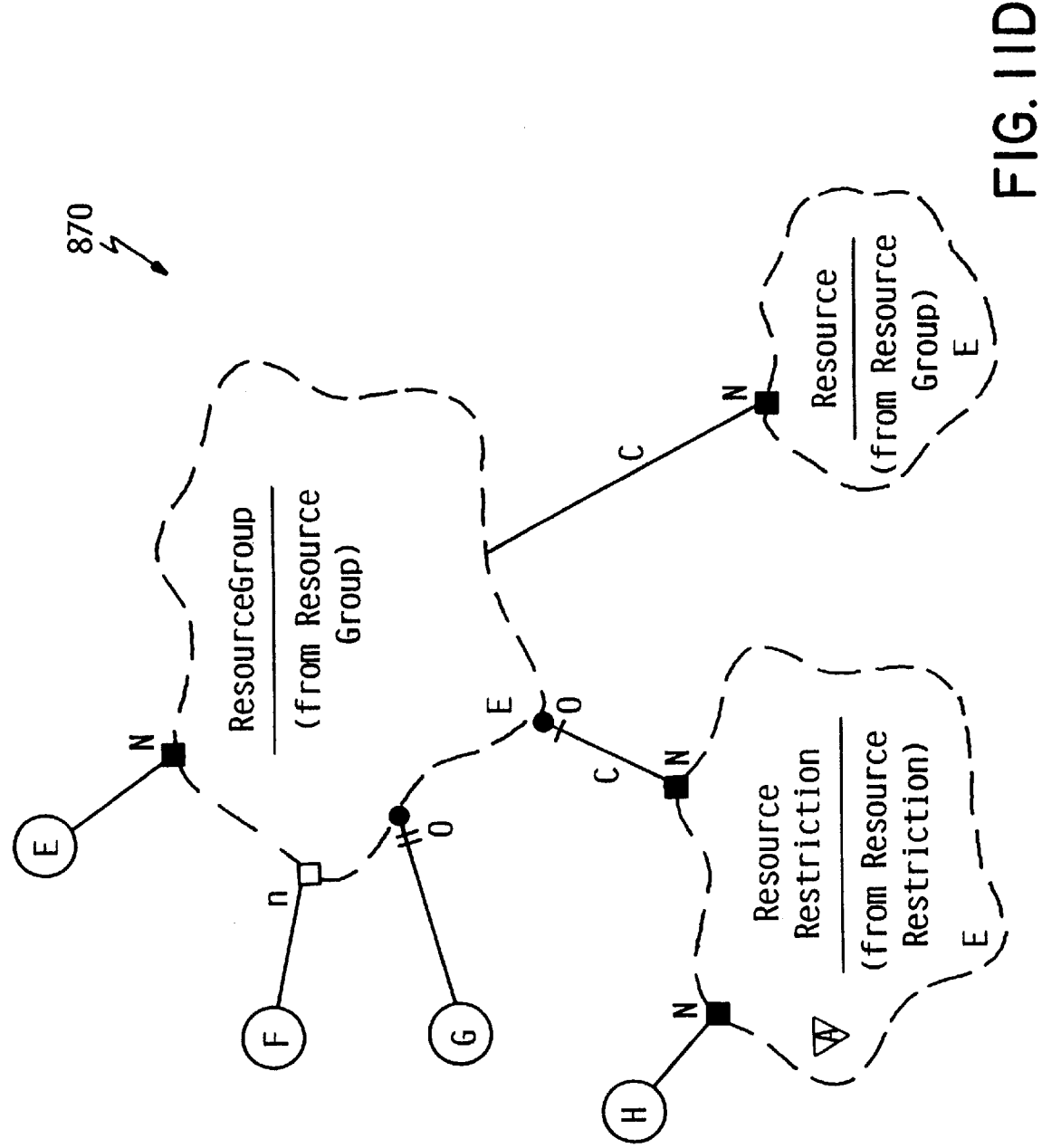

FIG. 10 is a category diagram of the configuration relations framework mechanism 870 in accordance with the preferred embodiment. Those skilled in the art will appreciate that the categories illustrated in FIG. 10 represent collections of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language.

The classes have been broken down into six categories: the Item Classes category, the Relationship Generator category, the Required Resource category, the Resource Group category, the Required Association category, and the Resource Restriction category. The Item Classes category is a core category of the framework (as indicated by the "C" label), meaning that a user cannot extend or modify classes in the Item Classes category. The remaining categories are extensible categories (as indicated by the "E" label), meaning that users may extend the classes in these categories by defining and implementing classes that are subclasses of framework-defined classes. The Relationship Generator category has a using relationship with the Item Classes, Required Resource, and Resource Group categories, indicating that classes within the Relationship Generator category may invoke the methods provided by the classes in these other categories. The Required Resource category has a using relationship with the Item Classes, Resource Group, Resource Restriction, and Required Association categories. The Resource Group category has a using relationship with the Item Classes, Required Resource, and Resource Restriction categories. Note that the relationships between categories are core relationships (as indicated by the "C" label), meaning that the framework user cannot modify these relationships.

FIG. 11 is a top level class diagram of the classes used to implement configuration relations framework 870. The Item Structure class, Relationship class, and Item class are all members of the Item Classes category. Classes that are members of the Relationship Generator category include: Relationship Generation, Assignment Controller, Configuration Item List, and Configuration Item. Classes that are members of the Required Resource category include: Required Resource, Required Resource Supplier, and Create Item. The Required Resource Association class is a member of the Required Association category. The Resource Group and Resource classes are members of the Resource Group category. And finally, the Resource Restriction class is a member of the Resource Restriction category. The methods provided in each class are not shown in FIG. 11, but are shown in subsequent figures, with the exception of the determineRelationships( ) method of the Relationship Generation class, which is used by a program to invoke the framework mechanism 870.

FIG. 11 illustrates the relationships between the classes in the framework. The core classes of the framework include: Relationship Generation, Item Structure, Item, Relationship, Assignment Controller, and Configuration Item List. The rest of the classes are extensible classes.

Figure 12A:
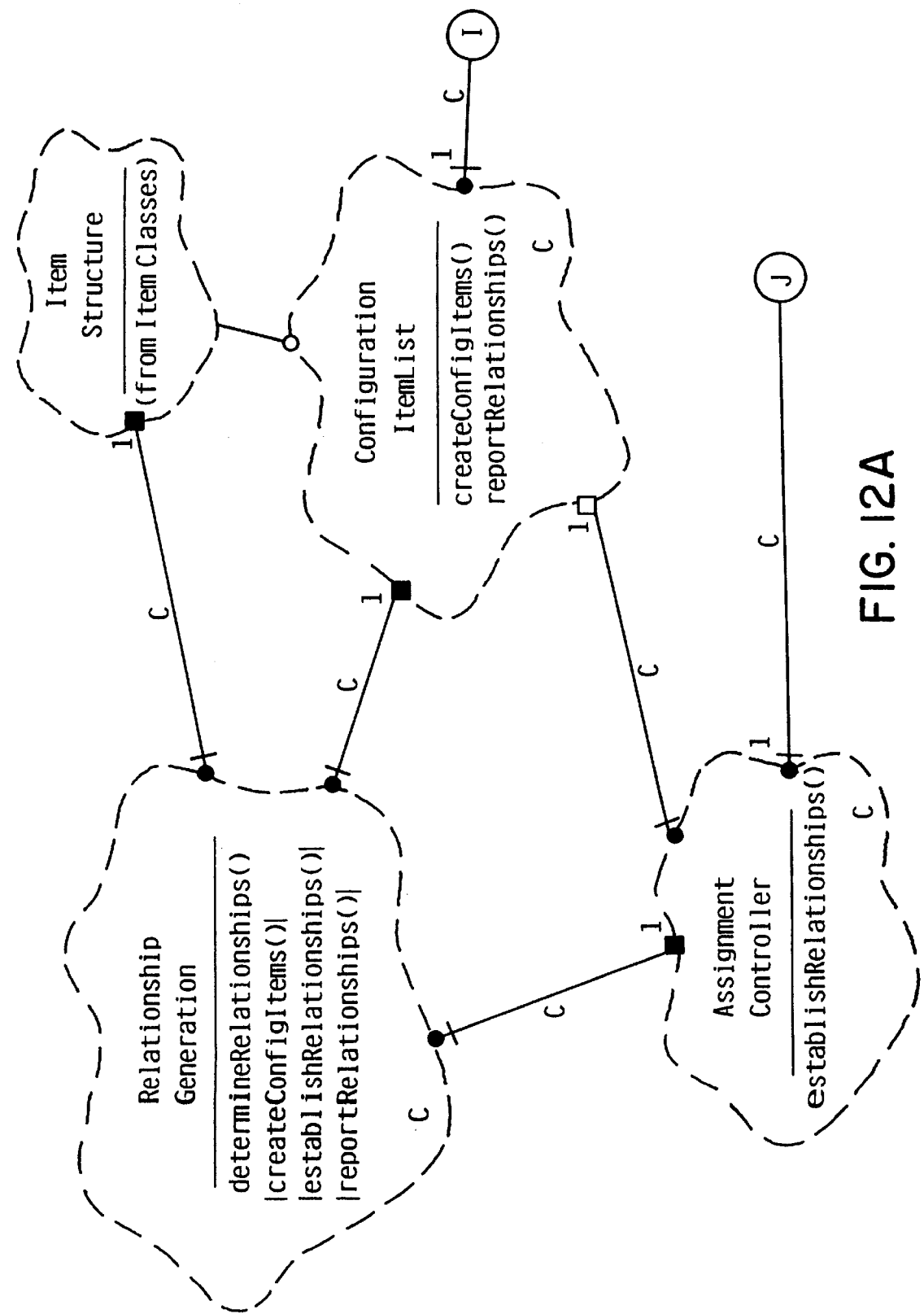

A class diagram of the classes in the Relationship Generator category are shown in FIG. 12. The Relationship Generation, Assignment Controller, and Configuration Item List classes are all core classes, while the Configuration Item class is an extensible class. The Relationship Generation class controls the flow of operations to establish configuration relationships on a given set of items to be configured. Relationship Generation has a "has by value" relationship with the Item Structure class, the Configuration Item List class, and the Assignment Controller class. The Assignment Controller class is responsible for prioritizing and controlling the sequence of the configuration relation assignment. Assignment Controller has a "has by reference" relationship to the Configuration Item List class and the Required Resource class. Assignment Controller may refer to several different Required Resource classes, as indicated by the "n" on the class relationship.

The Configuration Item List is a collection that contains items (i.e., configuration items) that will need to participate during configuration. Configuration Item List has a "has by value" relationship to the Configuration Item class, indicating that one or more Configuration Items exist within a Configuration Item List. The Configuration Item class is responsible for controlling its resource requirements and resource availability. The resource requirements are managed through the Required Resource objects, and the resource availabilities are managed through the Resource Group classes. Configuration Item has a "has by value" relationship with the Required Resource and Resource Group classes. Thus, a configuration item that is a user will have a Required Resource object and a configuration item that is a supplier will have a Resource Group object. Note that a single configuration item could be a user and a supplier at the same time, generally using some resource while supplying another. The relationships between these classes are core relationships, those that may not be changed by the user of the framework.

A user of the framework may extend the framework by subclassing from the extensible classes. Thus, for the Configuration Item class in FIG. 12, the Sample Configuration Item class is shown as one example of a suitable subclass from the Configuration Item class. This user-defined subclass may be defined and used to implement a portion of a desired configuration environment.

The core classes in FIG. 12 define a set of methods which provide many of the core functions needed for the framework to operate. Each of these methods correspond to functions that may be performed in determining configuration relations. The Relationship Generation class has a method determineRelationships( ), which is used by a main program to invoke the framework mechanism in order to determine the relationships between items in a particular configuration environment. The determineRelationship( ) method determines the relationships of all items within the Item Structure that correspond to the desired configuration by executing the methods createConfigItems( ), establishRelationships( ), and reportRelationships( ). These three methods are wrapper methods that implement their functions by invoking the methods of the same name on the Configuration Item List and on the Assignment Controller classes.

The Assignment Controller class has a method establishRelationships( ). This method is used to initiate a sequence of events that will determine the possible relationships between configuration items, and will make appropriate assignments of relationships according to predetermined preferences. The Configuration Item List has two methods, createConfigItems( ) and reportRelationships( ). CreateConfigItems( ) is used to create each configuration item within the Configuration Item List. Note that the Configuration Item List class has a using relationship to the Item Structure class. The Configuration Item List class uses the createConfigItems( ) method to get an item from the item structure that corresponds to the desired configuration, and to create a configuration item for that item if required or needed. The reportRelationship( ) method reports the relationships between the various configuration items.

The Configuration Item class is an extensible class that defines a method reportRelationships( ). The reportRelationships( ) method is invoked to request that each required resource report their relationship, and may also append additional information to a given relationship that was created for a particular required resource.

Figure 13:
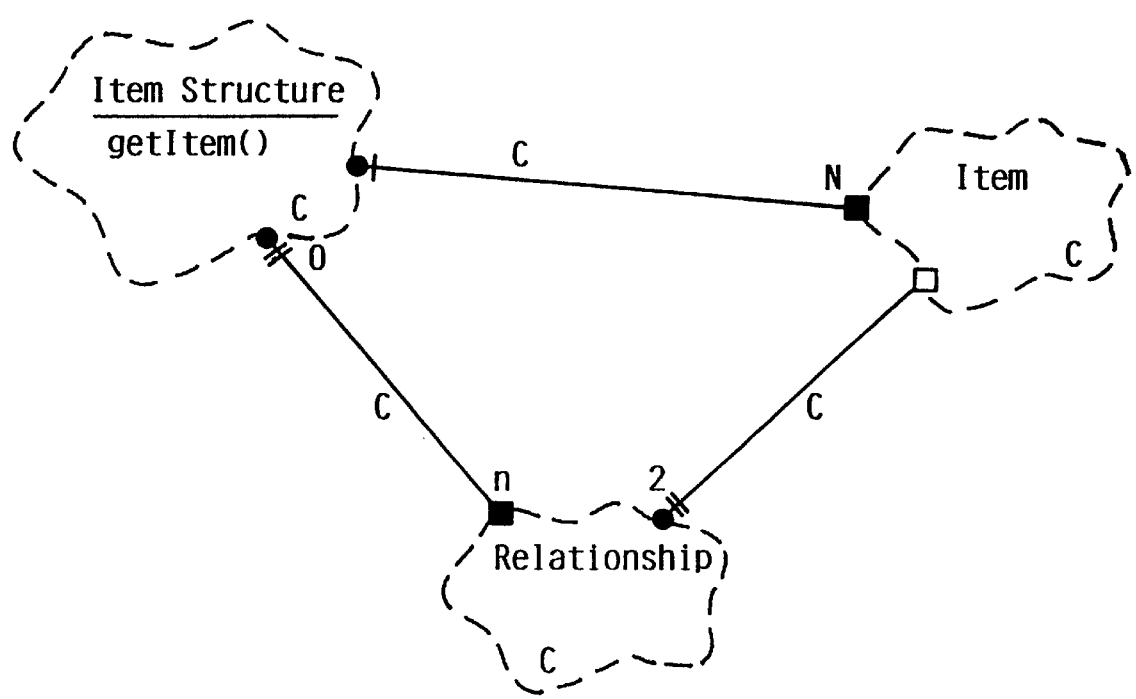

Referring to FIG. 13, the classes in the Item Classes category include an Item Structure class, and Item class, and a Relationship class. Item Structure is a class that contains a tree structure of configurable items. The tree structure defines the composition structure of the configurable items in a domain. Nodes in the tree represent potential configurable items. Branches off a node connect child items that represent the next layer of composition of the potential configurable items in this domain. For example, in the convention planning domain, a convention facility might be the root of the tree. Child nodes off the root might be a facility's conference rooms, meeting rooms, and arenas. Any of these could be broken down further to fully describe the domain of the items to be configured.

Each Item Structure may have multiple Items and multiple Relationships, as indicated by the "has by value" class relationships. In addition, the Relationship class has a "has by reference" relationship with the Item class. The Item Structure class has a method getItem( ) that is used to retrieve an item from within the Item Structure. As discussed above, the Item Structure is a compilation of all possible items that may be needed for any possible configuration. The relationships for the items stored in the Item Structure are defined by the Relationship class, which may contain an array, table, or other suitable data structure which is capable of correlating relationships between items. The framework disclosed herein assumes that the Item Structure is created and filled prior to the main program invoking the framework.

Figure 14A:
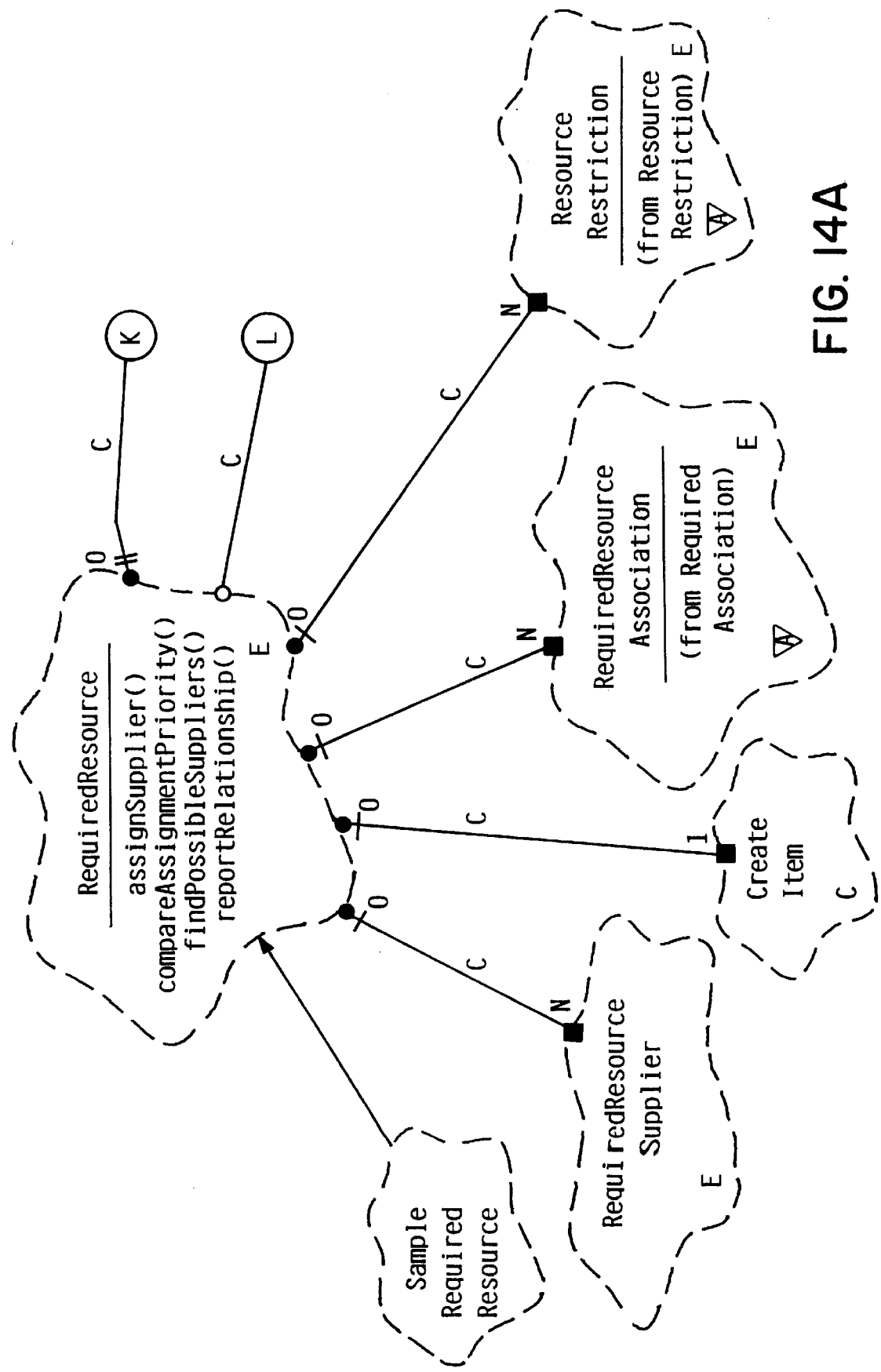
Figure 14B:
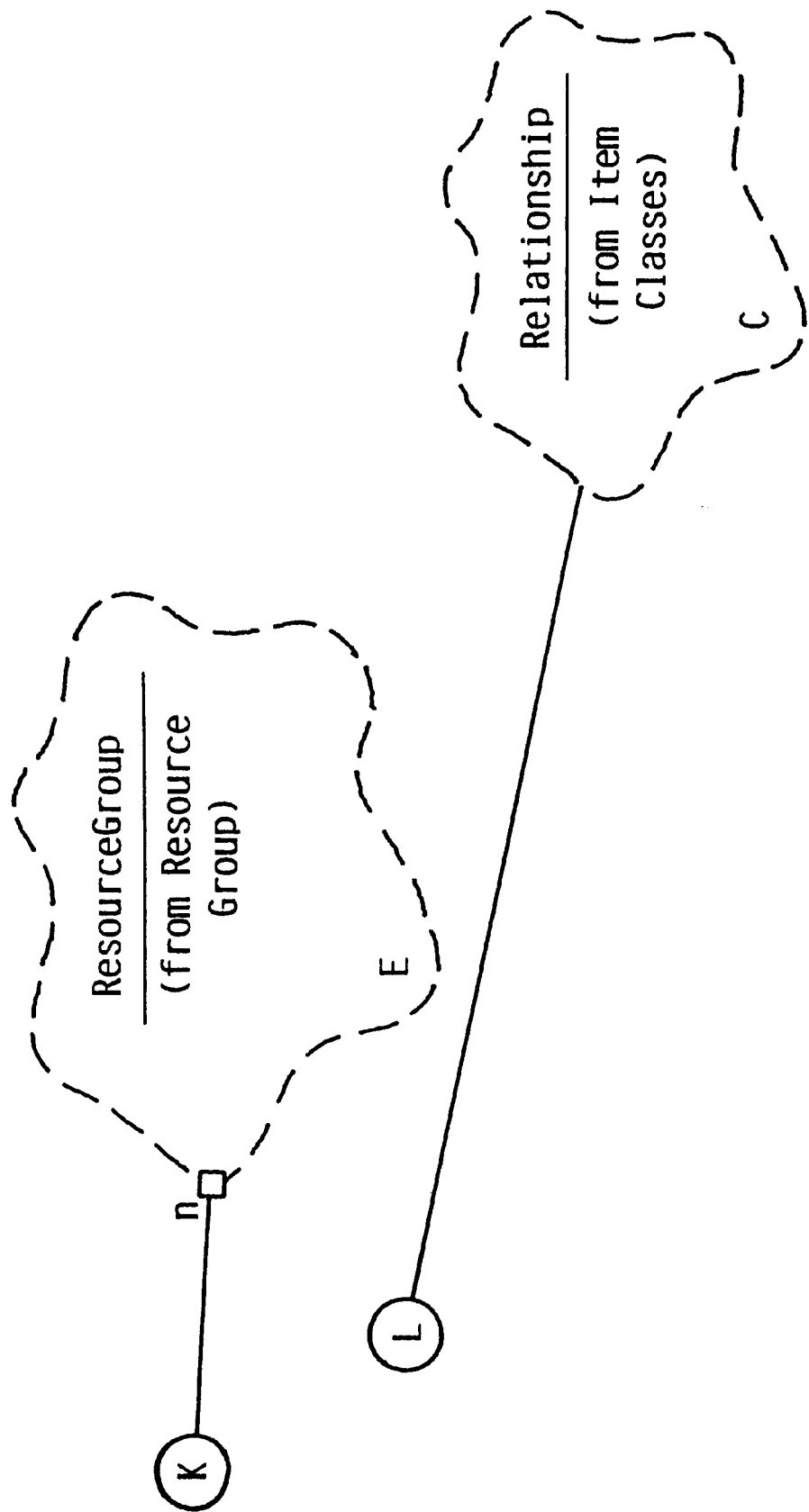

Referring to FIG. 14, the classes in the Required Resource category are the Required Resource class, the Required Resource Supplier class, and the Create Item class. The Required Resource class has a "has by value" relationship with each of the Required Resource Supplier class, the Create Item class, the Required Resource Association class, and the Resource Restriction class, and may contain one or more objects from each of these classes. Required Resource also has a "has by reference" relationship with one or more Resource Groups. In addition, the Required Resource class has a using relationship with the Relationship class, indicating that Required Resource may call one or more methods on the Relationship class.

Required Resource is a class that is the root of an inheritance hierarchy so that Assignment Controller can exploit subclasses of Required Resource in a polymorphic manner. The Required Resource base class defines an interface that allows the Assignment Controller to treat all required resources in a similar manner. In addition, default methods are provided, which may be used or overridden as required in each subclass. The Required Resource class defines four methods, namely: assignSupplier( ), compareAssignmentPriority( ), findPossibleSuppliers( ), and reportRelationships( ). The findPossibleSuppliers( ) method is used to determine which Resource Groups could be suppliers to a selected Required Resource. Once the set of possible suppliers (i.e., Resource Groups) is determined, the assignSupplier( ) method establishes a supplier relationship between the selected Resource Group and the selected Required Resource. The compareAssignmentPriority( ) method determines the assignment order with respect to other required resources. If a particular Required Resource subclass needs to handle priorities in a special way, this method's implementation will reflect the preferences. The reportRelationship( ) method creates a relationship if and only if the Required Resource has been satisfied (i.e., if there exists a supplier for the required resource), adds the user information and any additional information that is required, and requests that the Resource Group (supplier) report its relationship data. Required Resource is an extensible class, and appropriate subclassing by a framework user will define a desired configuration environment. As shown in FIG. 14, Sample Required Resource is a sample subclass that may be defined by the framework user to determine the attributes of the Required Resource. Note that a Required Resource may have a dependency on one or more other Required Resources, and must ensure that this dependency is taken into consideration when determining the relationships between configuration items. These dependencies are handled by the Required Resource Associations class, which is described in more detail below with reference to FIG. 16.

The Required Resource Supplier class determines the valid suppliers and the order of preference of suppliers. Required Resource Supplier is extensible to allow a framework user to specify appropriate criteria for validating and ranking suppliers.

The Create Item class contains all the data required to create an additional configuration item that could satisfy the requirements of the Required Resource. The additional item is created through the Assignment Controller, and will require a configuration item to also be created. For example, if a framework for configuring computer systems requires that all slots in a card cage are filled, and if fewer than all the slots are filled with needed cards for a specific configuration, dummy cards may be instantiated under the Create Item class to fill the card cage.

Figure 15A:
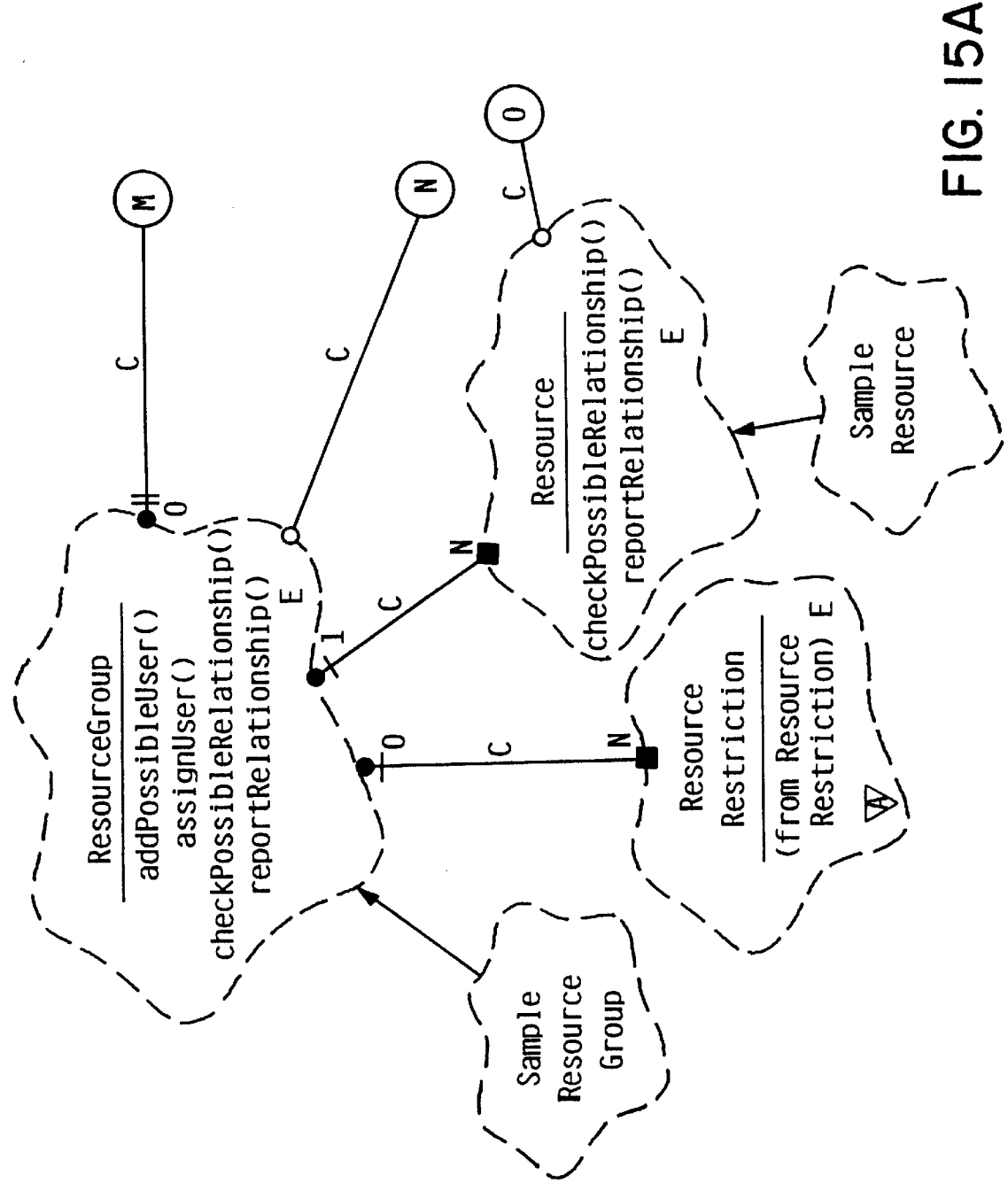
Figure 15B:
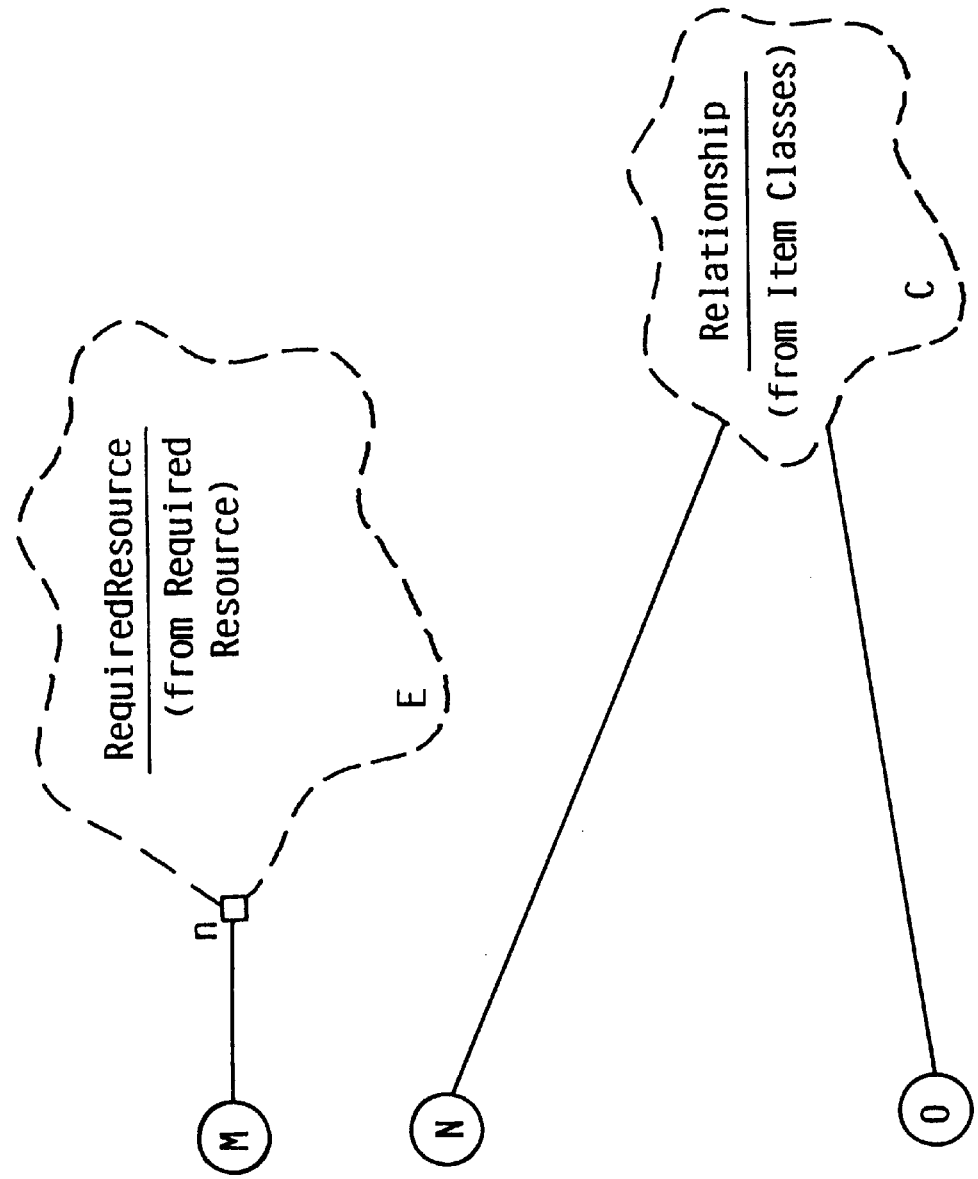

Referring to FIG. 15, the Resource Group category includes the Resource Group class and the Resource class, which are both extensible classes of the framework. The Resource Group class has a "has by value" relationship with the Resource class and the Resource Restriction class, and has a "has by reference" relationship with the Required Resource class. In addition, Resource Group has a using relationship with the Relationship class. Resource Group is a class at the root of an inheritance hierarchy that allows Required Resources to exploit subclasses of the Resource Group class in a polymorphic manner. The Resource Group class defines an interface that allows the Required Resource to treat all resource restrictions in a similar manner, and also defines default methods.

The Resource Group class defines the following methods: addPossibleUser( ), assignUser( ), checkPossibleRelationship( ), and reportRelationship( ). The addPossibleUser( ) method adds a resource to a list of possible users of a selected configuration item. The assignUser( ) method is used to select one of the possible users (i.e., Required Resources) and to establish a relationship between the Resource Group (a supplier) and a Required Resource (a user). The checkPossibleRelationship( ) method is invoked to determine the set of possible relationships for a selected Resource Group. The reportRelationship( ) method adds supplier information and any additional information that is required to the given relationship that was created by the Required Resource (user), and asks the assigned resource to report its relationship information.

The Resource class is as the root of an inheritance hierarchy that allows Resource Group objects to exploit subclasses of the Resource class in a polymorphic manner. The Resource base class defines an interface that allows the Resource Group to treat all resources in a similar manner, along with defining default methods. The Resource class defines methods that include checkPossibleRelationship( ) and reportRelationship( ). The checkPossibleRelationship( ) method is used to determine if a Required Resource can be assigned or not. The reportRelationship( ) method is used to add any additional information that is required for the relationship that was created by the Required Resource (user). Both Resource Group and Resource are extensible classes, and Sample Resource Group and Sample Resource as shown as possible user-defined subclasses that implement a portion of a desired configuration environment.

Figure 16:
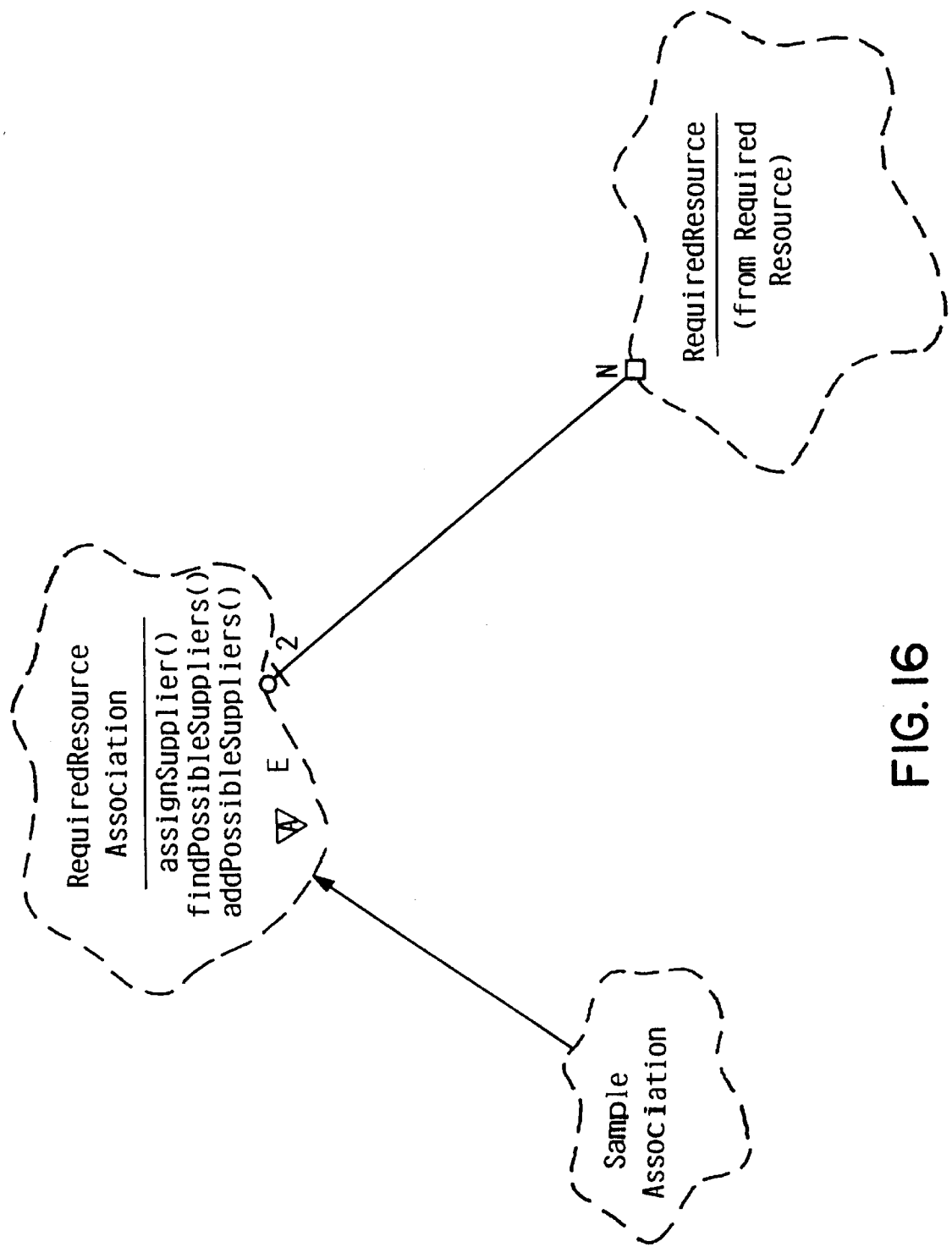

Referring to FIG. 16, the Required Association category includes a Required Resource Association class that is an extensible abstract class of the framework. The Required Resource Association class has a "has by reference" relationship with the Required Resource class, and may contain two or more Required Resources (because two required resources must be present for there to exist a Required Resource Association between the two). The Required Resource Association class is at the root of an inheritance hierarchy that allows Required Resource objects to exploit subclasses of Required Resource Association in a polymorphic manner. The Required Resource Association class defines an interface that allows a Required Resource object to treat all Required Resource Associations in a similar manner, and also defines default methods. The Required Resource Association class defines two methods, assignSupplier( ) and findPossibleSuppliers( ). The findPossibleSuppliers( ) method is used to identify which Resource Groups may be suppliers for a selected Required Resource. The assignSupplier( ) method is invoked to choose one of the possible Resource Groups as a supplier and to assign it as the supplier for the selected Required Resource. The Sample Association subclass is another example of a user-extended subclass that defines a Required Resource Association. Note also that Required Resource Association is an abstract class, indicating that the user must extend this class to define any Required Resource Associations that may exist in a particular configuration environment.

Figure 17:
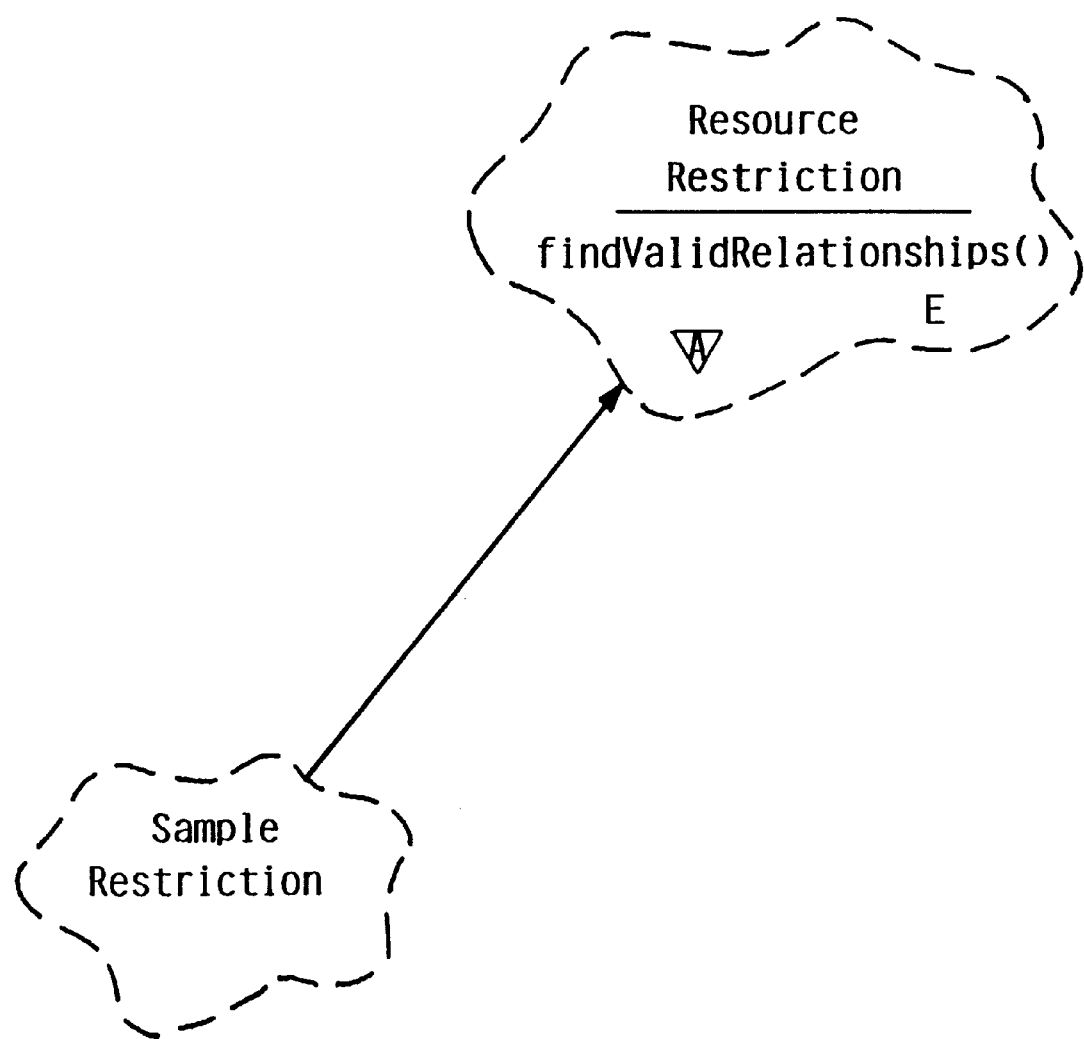

Referring to FIG. 17, the Resource Restriction category includes a Resource Restriction class that is an abstract class at the root of an inheritance hierarchy to allow Resource Group objects to exploit subclasses of the Resource Restriction class in a polymorphic manner. The Resource Restriction class defines an interface that allows a Resource Group object to treat all resource restrictions in a similar manner, and also defines default methods. One such method is findValidRelationships( ). This method is invoked to determine which Resources are valid according to a given set of constraints or predetermined parameters. Note that Resource Restriction is an extensible abstract class, which must be extended by the framework user through appropriate subclassing. Sample Restriction is one example of a suitable subclass that implements a portion of a desired configuration environment.

Core Functions

FIG. 11 best distinguishes between core and extensible functions in the configuration relations framework of the present invention. Specifically, as noted above, many of the classes in this framework are extensible classes. All class relationships shown in FIG. 11 are core relationships, and may not be modified by the user of the framework. In fact, it is the fixed character of these relationships between classes that characterizes a framework and makes it useful and powerful. The core function of the configuration relations framework is defined by the core classes, the core class relationships, and the functional requirements that cause the framework to behave in the desired manner. As described above with respect to FIG. 9, the overall core function of the configuration relations framework includes the steps of method 900. The specific steps that make up any configuration environment depend on how the user of the framework extends the classes and defines (or overrides) the appropriate methods.

Object Interaction

Figure 18A:
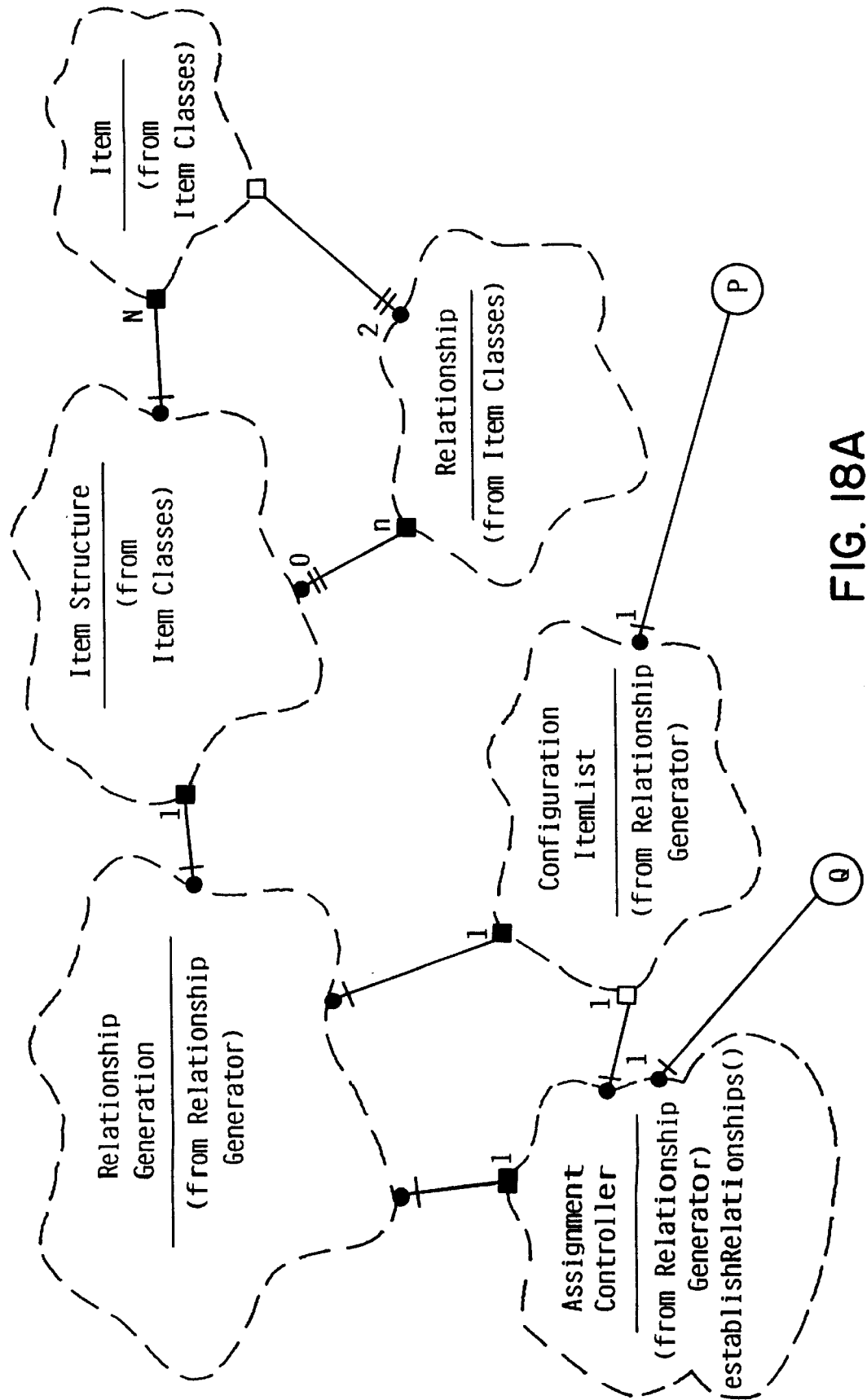
FIG. 18 is a class diagram showing the extension of the framework to implement two specific configuration environments.
Figure 18B:
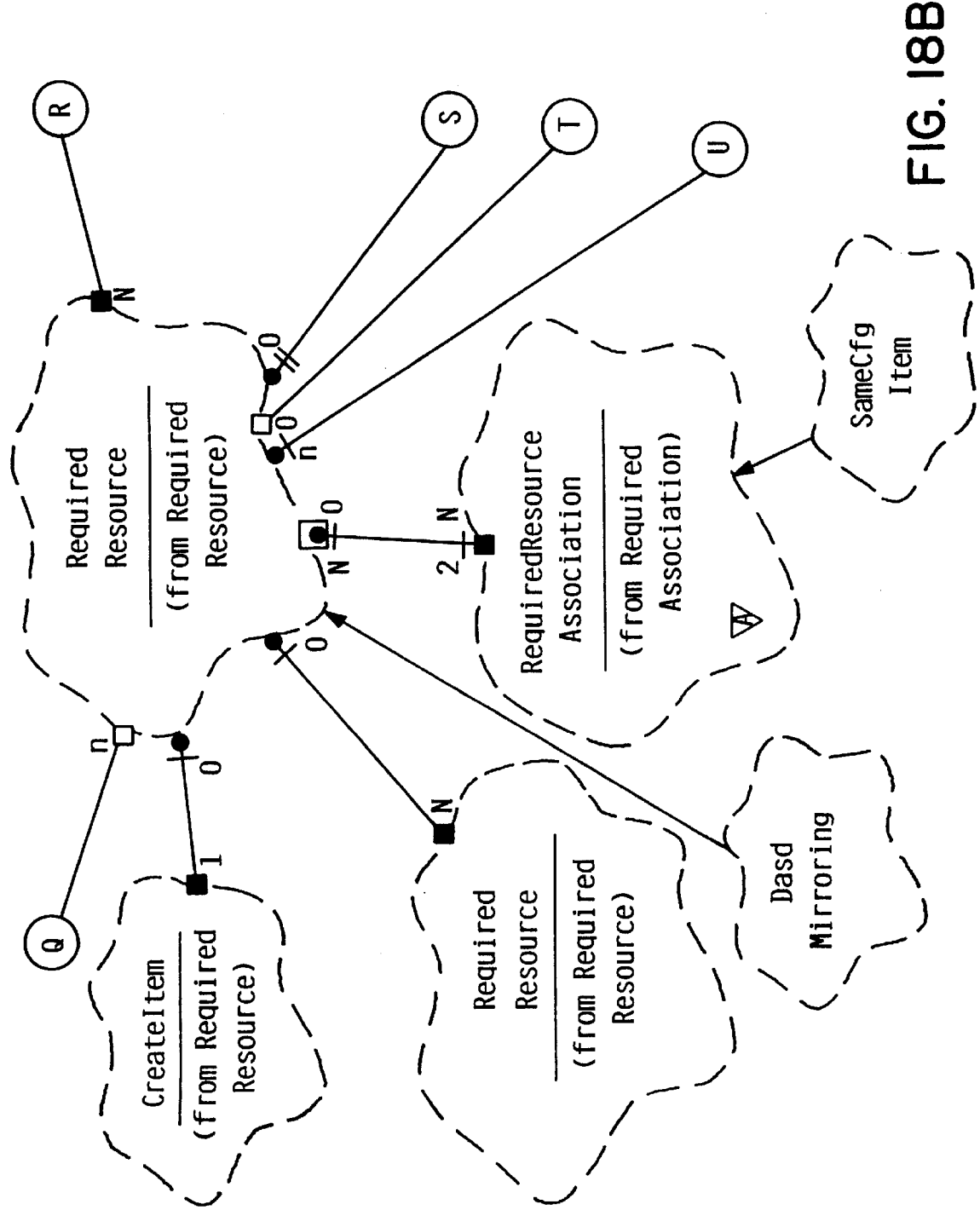
Figure 18C:
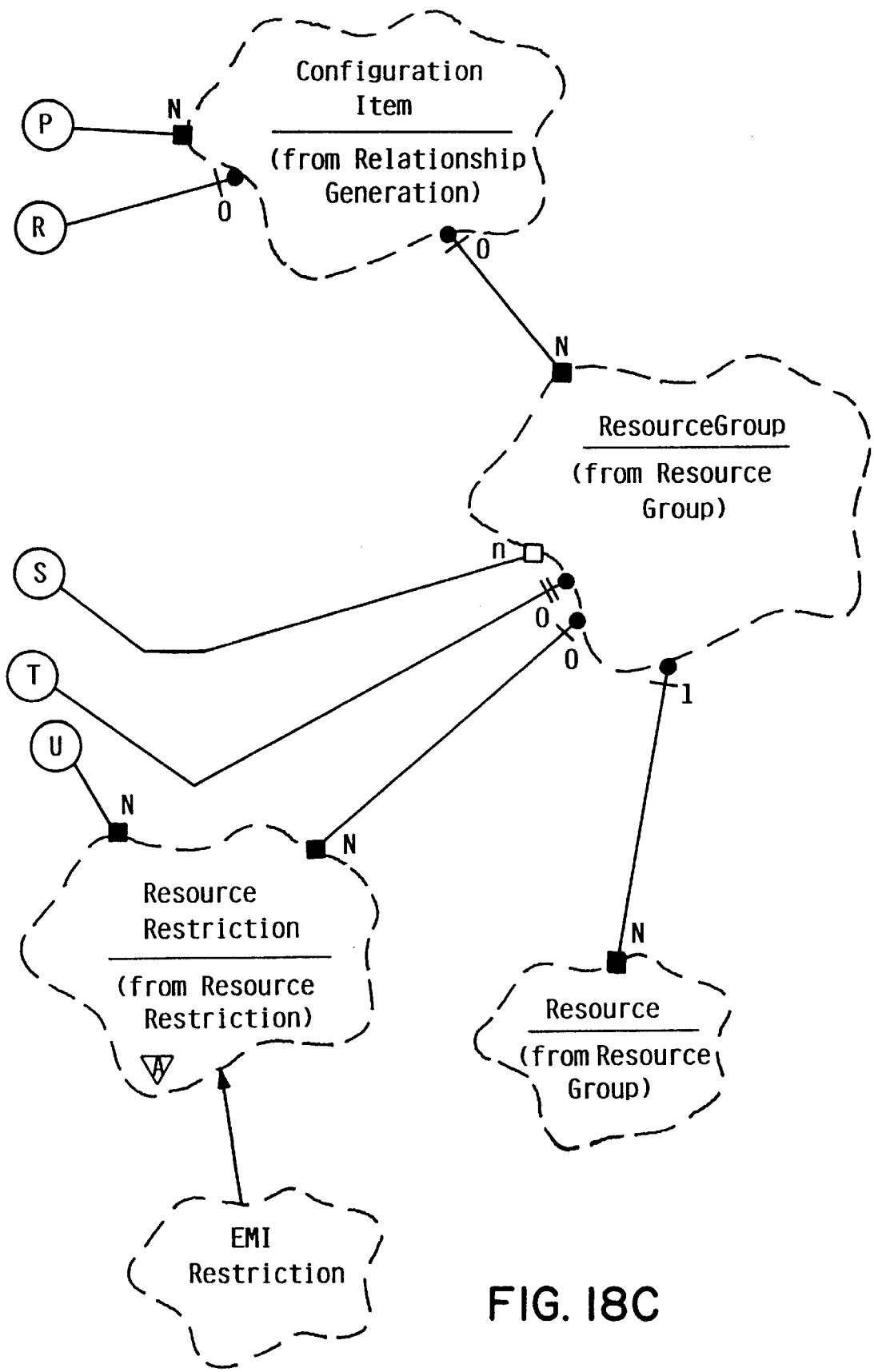
Figure 19A:
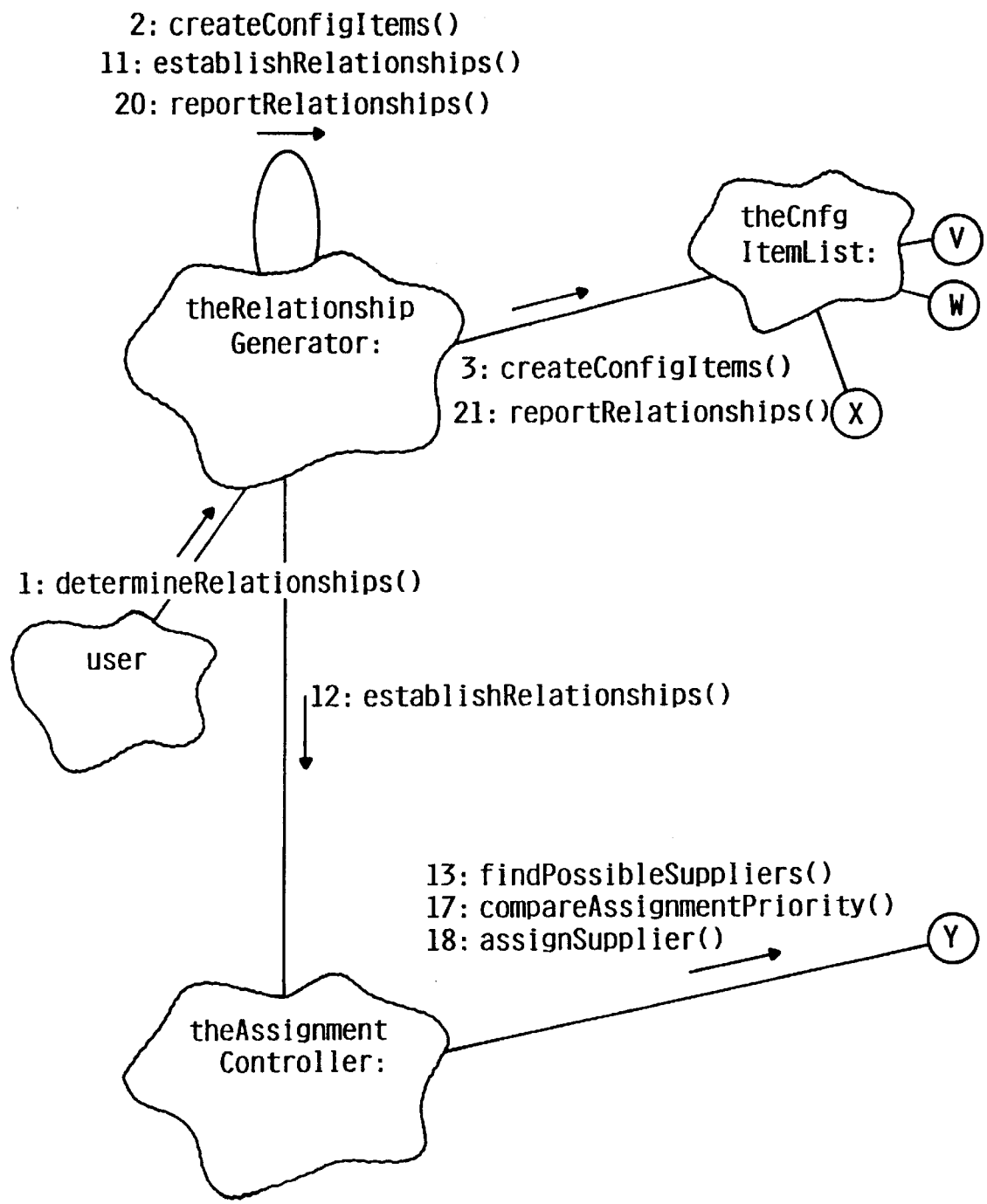
FIGS. 19 and 20 are object diagrams of the configuration environments of FIG. 18.
Figure 19B:
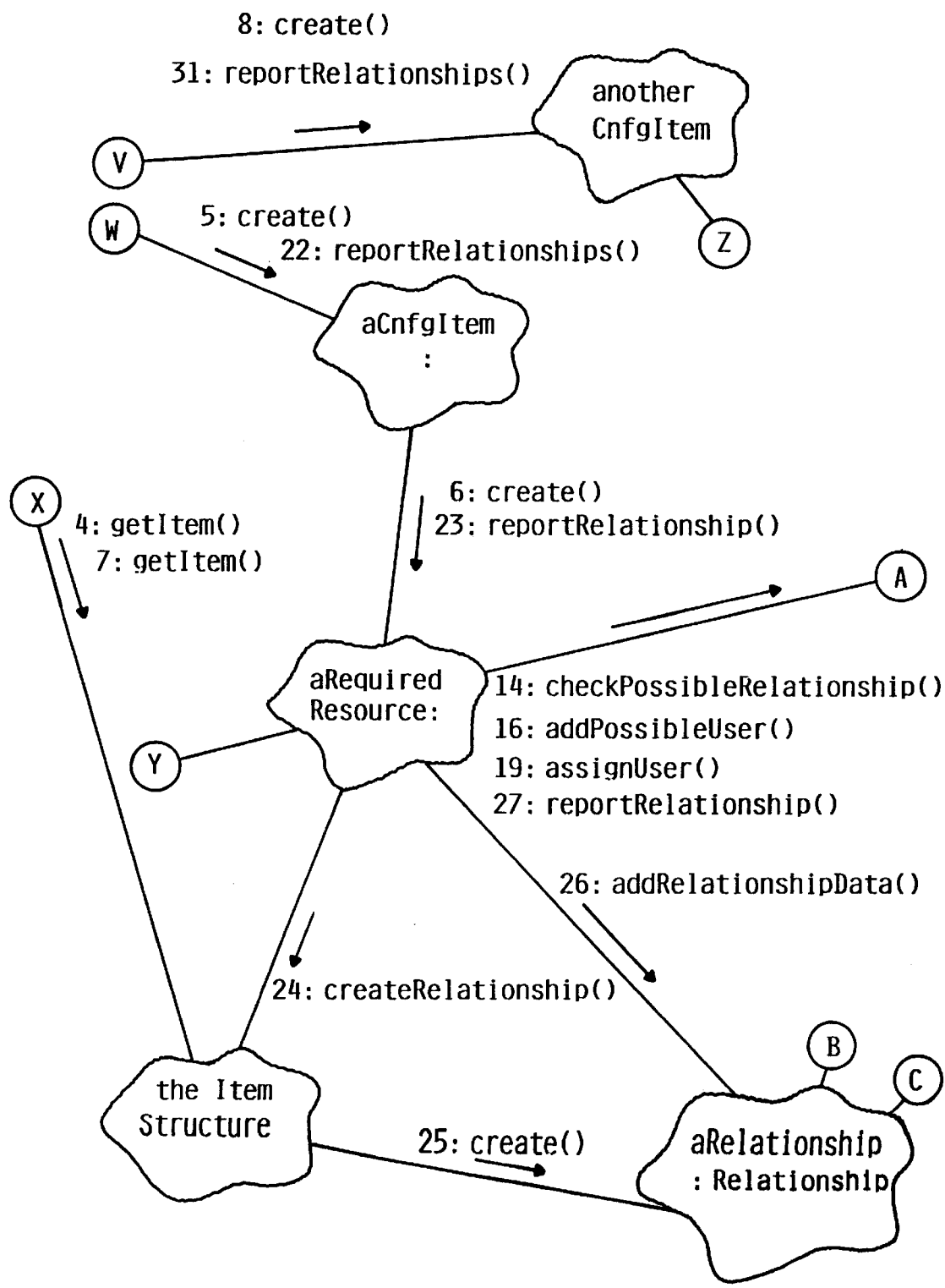
Figure 19C:
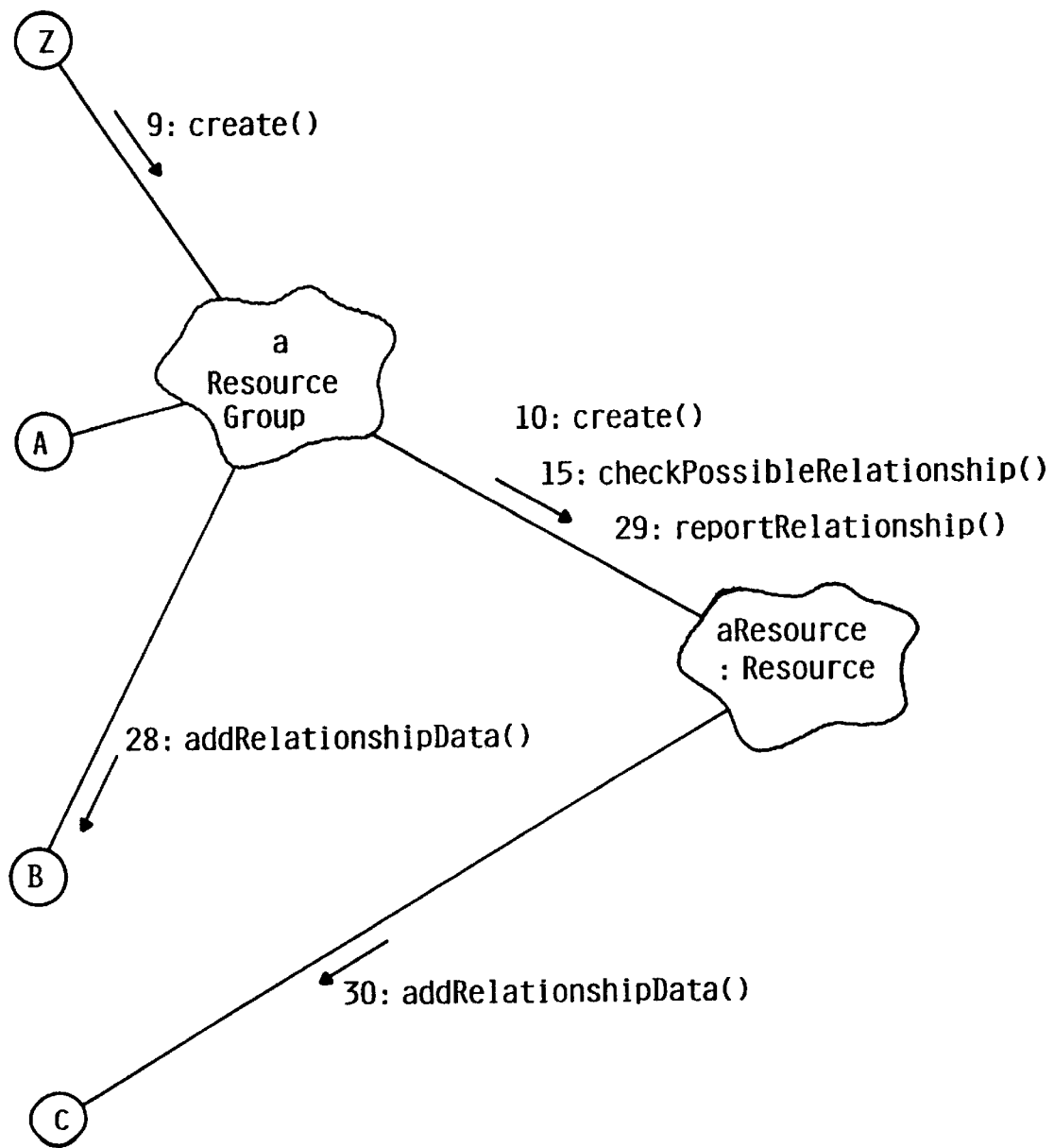
Figure 20A:
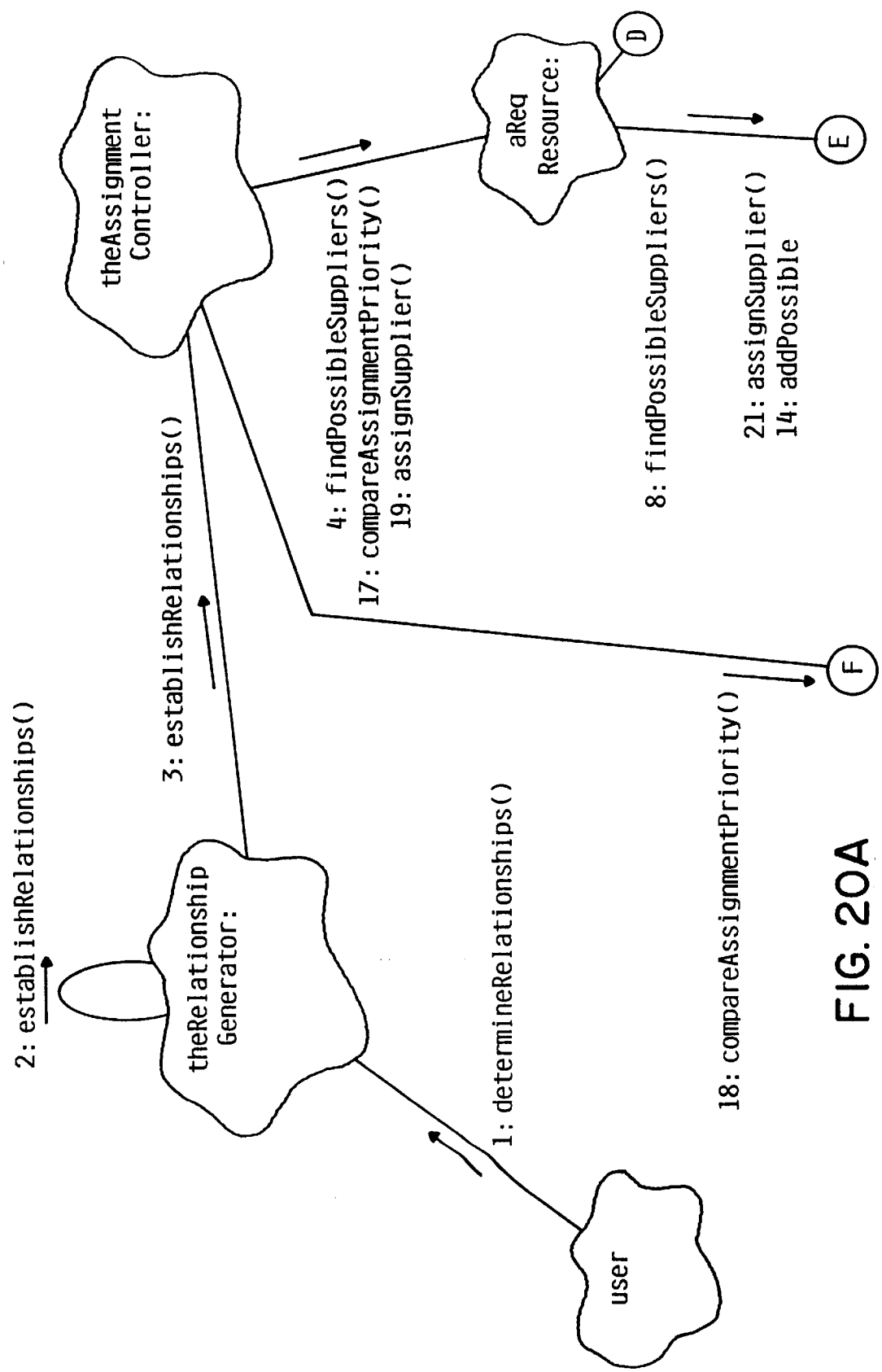
Figure 20C:
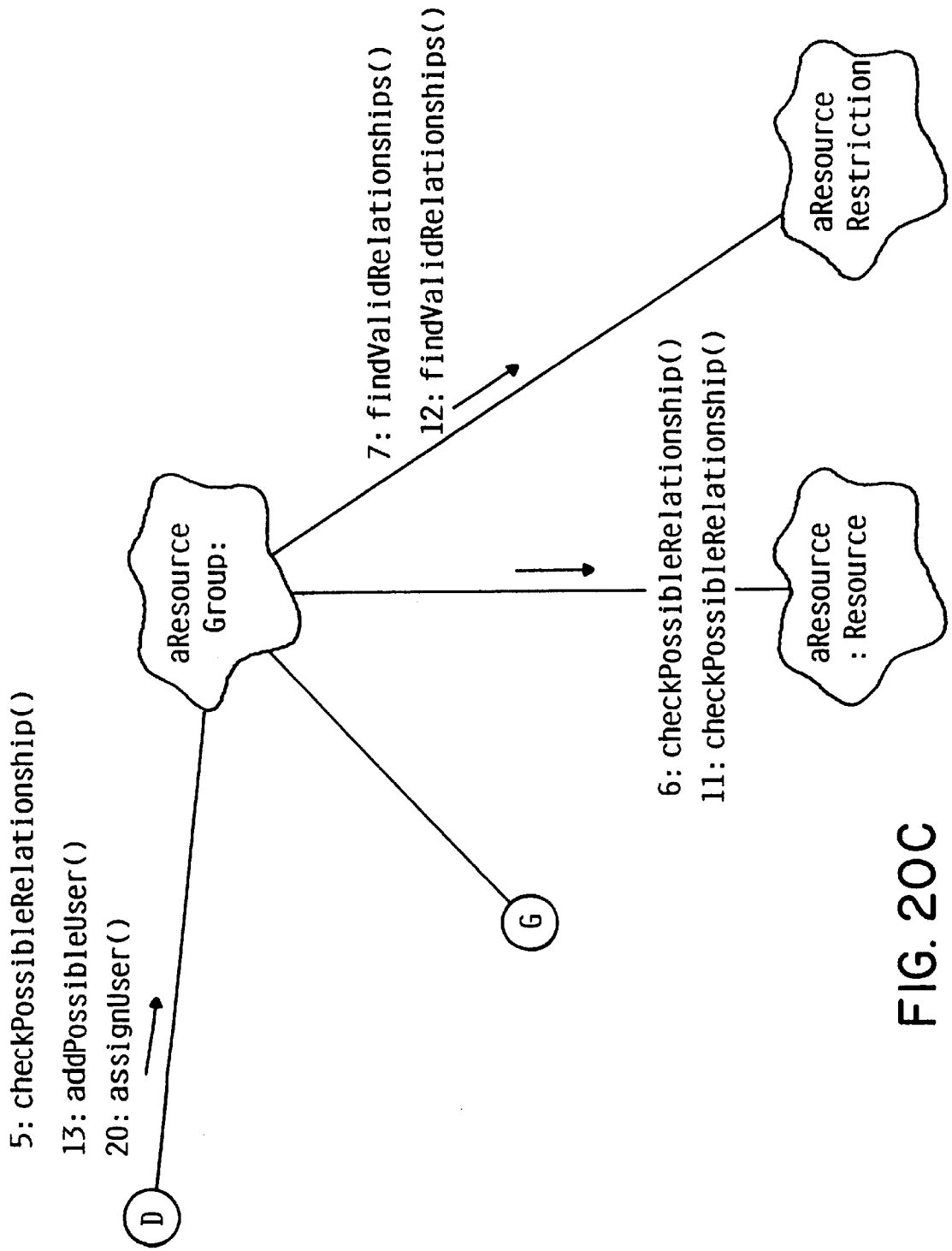

The operation of the framework of FIG. 11 may best be understood by the class diagram of FIG. 18, and the object diagrams of FIGS. 19 and 20. Three subclasses are shown: DASD Mirroring, Same Cfg Item, and EMI Restriction. DASD Mirroring is a subclass of Required Resource that is extended by the framework user to define how the assignment of suppliers for DASD Mirroring is accomplished. Systems that mirror DASD need to be configured differently than those that do not. Mirroring implies that additional DASD units are included in the configuration to guard against the loss of critical data by copying or "mirroring" all critical data on two or more separate DASD units. The assignSupplier( ) and compareAssignmentPriority( ) methods would likely be overridden in the DASD Mirroring class to accomplish the desired differences.

The Same Cfg Item is a user-extended subclass of Required Resource Association. This subclass is created to ensure that two different suppliers come from the same item. An example of where this subclass might be used would be to ensure that a card slot and the power provided for that card come from the same tower enclosure. Likely methods that would be overridden in Same Cfg Item would be assignSupplier( ) and findPossibleSuppliers( ).

EMI Restriction is a subclass of Resource Restriction that is extended by the framework user to ensure that certain items during a computer system configuration are not placed next to each other because of electromagnetic interference (EMI). The method findValidRelationships( ) could be overridden to implement this function.

Other extensible classes within the example of FIG. 18 could also be subclassed as desired by the programmer using the framework. For example, each of the following classes may be subclassed by the user of the framework, even though no such subclasses are shown in FIG. 18: Configuration Item, Resource Group, Required Resource Supplier, and Resource. The extended framework in FIG. 18 is shown to illustrate one way a programmer might use the framework to define a specific configuration environment.

The detailed operation of framework 870 in accordance with the present invention will now be illustrated with reference to the specific configuration environment shown in FIG. 18 and the resulting object diagram of FIG. 19. A main program invokes the framework by calling the determineRelationships( ) method of theRelationshipGenerator object (step 1). TheRelationshipGenerator object then invokes its own createconfigItems( ) method (step 2), which is a wrapper method that invokes the createconfigItems( ) constructor (step 3). The createconfigItems( ) constructor instantiates theCnfgItemList object, which contains the configuration item list. When theCnfgItemList object is created, it is empty, and must be populated with the appropriate items from theItemStructure that are applicable to this particular configuration environment. An item is then retrieved by invoking the getItem( ) method on theItemStructure object (step 4). Note that theItemStructure is not dynamically created, but instead is a database of all possible items that was created previously, before the framework mechanism was invoked. The item that is retrieved is then instantiated as a configuration item by invoking the create( ) constructor on the Configuration Item class (step 5), which instantiates an object aCnfgItem that contains the first item retrieved from theItemStructure. Assuming this configuration item is a required resource, the next step is to invoke the create( ) constructor on the Required Resource class (step 6), which creates an object aRequiredResource.

The next step is to get the next item from theItemStructure by invoking the getItem( ) method (step 7). This second item is added as a configuration item by invoking the create( ) constructor on the Configuration Item class (step 8), which instantiates an object anotherCnfgItem that contains the second item. Assuming the second item (now contained in the anotherCnfgItem object is a resource that defines a resource group, the create( ) constructor on the Resource Group class is invoked (step 9), which instantiates an object aResourceGroup. Next, the create( ) constructor on the Resource class is invoked (step 10), which instantiates an object aResource. At this point we assume that these are the only two configuration items in the Item Structure, so all the required objects have been created for this very simple example framework. The next step is to establish the relationships between the two configuration items that now exist within the framework by determining the relationships between the Required Resource objects and Resource Group objects corresponding to these two configuration items.

The relationships between these two configuration items, namely aCnfgItem and anotherCnfgItem, are established by theRelationshipGenerator object invoking its own establishrelationships( ) method (step 11), which is a wrapper method that invokes the establishRelationships( ) method on theAssignmentController object (step 12). In response, theAssignmentController invokes the findPossibleSuppliers( ) method on the aRequiredResource object (step 13). aRequiredResource then invokes the checkPossibleRelationship( ) method of the aResourceGroup object (step 14), which in turn invokes the checkPossibleRelationship( ) method of the aResource:Resource object (step 15). The possibility (or not) of a relationship is returned to aRequiredResource, which then invokes the addPossibleUser( ) method on the aResourceGroup object (step 16). Now that aResourceGroup knows that a Required Resource is a possible user of aResourceGroup, the framework can now determine whether aResourceGroup is a supplier of aRequiredResource. The compareAssignmentPriority( ) method is then invoked (step 17) to determine the parameters for assigning aRequiredResource. The object theAssignmentController then invokes the assignSupplier( ) method of the aRequiredResource object (step 18), which assigns a Resource Group as a supplier to aRequiredResource. With aResourceGroup being a supplier, aRequiredResource must be a user, and this relationship is established by invoking the assignUser( ) method on the aResourceGroup object (step 19). With a supplier and user being defined for these two objects in this simple example, all of the relationships have been established.

The next step is to report these relationships and store the results in a data structure (such as a table or array) that will reflect all the configuration relations in a particular configuration environment. This is done by theRelationshipGenerator invoking its own reportRelationships( ) method (step 20), which is a wrapper method that invokes the reportRelationships( ) method on the theCnfgItemList object (step 21). This method requests that each Configuration Item report their relationship by invoking the reportRelationship( ) method on each configuration item. For this example, the reportRelationship( ) method on aCnfgItem is invoked (step 22). Because aCnfgItem corresponds to a required resource, it invokes the reportRelationship( ) method on aRequiredResource (step 23). This method creates a relationship if and only if aRequiredResource has been satisfied (i.e., if there exists a supplier). The anotherCnfgItem object does not correspond to a required resource, so no relationship is reported.

Now that all the relationship information has been reported, the createRelationship( ) method on theItemStructure object is invoked (step 24). This causes theItemStructure to invoke the create( ) constructor on the Relationship class (step 25), which instantiates the aRelationship:Relationship object. Once the new object is created to store the relationships data, the aRequiredResource object invokes the addRelationshipData( ) method (step 26). This new relationship is then reported to the aResourceGroup object by invoking its reportRelationship( ) method (step 27). Next, the relationship data for aResourceGroup is added to the aRelation:Relation object by invoking its addRelationshipData( ) method (step 28). This new relationship is reported to the aResource:Resource object by the aResourceGroup object invoking its reportRelationship( ) method (step 29). Next, relationship data for the aResource:Resource object is added by invoking the addRelationshipData( ) method on the aRelationship:Relationship object (step 30). The object theCnfgItemList then invokes the reportRelationships( ) method on the anotherCnfgItem object (step 31). At this point the operation of the framework is complete, with the configuration relations for these two configuration items in this example residing in the aRelationship:Relationship object.

Referring now to FIG. 20, a second example is shown that illustrates the operation of the framework mechanism 870 of the preferred embodiment. For this example, the steps of creating the configuration items list (steps 2–10 of FIG. 19) and the steps of reporting the relationships (steps 20–31 of FIG. 19) are omitted for the purpose of highlighting how the relationships between configuration items are established. For this example, we have two configuration items (not shown). The first has two required resources, corresponding to the objects aReqResource and anotherReqResource, which have a required association represented by the aReqAssociation object. A second configuration item (not shown) has a resource group represented by the aResourceGroup object, that has a single resource aResource and a resource restriction aResourceRestriction. We now wish to determine the configuration relations between the two required resources aReqResource and anotherReqResource and aResourceGroup using the framework as shown in FIG. 18.

The framework is invoked by a main program invoking the determineRelationships( ) method on theRelationshipGenerator object (step 1). This results in the object theRelationshipGenerator invoking its own establishRelationships( ) method (step 2), which is a wrapper method that invokes the establishRelationships( ) method of the object theAssignmentController (step 3). The object theAssignmentController then invokes the findPossibleSuppliers( ) method of the aRequiredResource object (step 4). This causes aRequiredResource to invoke the checkPossibleRelationship( ) method on the object aResourceGroup (step 5), which in turn causes aResourceGroup to invoke the checkPossibleRelationship( ) method on the aResource:Resource object (step 6). The possible relationships are then filtered by invoking the findValidRelationships( ) method on the aResourceRestriction object (step 7), which eliminates all of the possible relationships that violate the resource restriction parameters specified in aResourceRestriction. At this point we have a list of possible relationships that satisfy the resource restrictions.

From this list, we determine the possible suppliers by invoking the findPossibleSuppliers( ) method on the object aReqAssociation (step 8) and the findPossibleSuppliers( ) method on the object anotherReqResource (step 9). The method checkPossibleRelationship( ) on the object aResourceGroup is then invoked (step 10), resulting in calling the checkPossibleRelationship( ) method on the aResource:Resource object (step 11), and calling the findValidRelationships( ) method on the aResourceRestriction object (step 12). We now have a list of possible and valid suppliers.

The next step is to invoke the addPossibleUser( ) method on the object aResourceGroup (step 13). This results in invoking the addPossibleSupplier( ) method of the aReqAssociation object (step 14) and the anotherReqResource object (step 15). Next, the method addPossibleUser on the aResourceGroup object is invoked (step 16). Now the priorities for assigning aReqResource and anotherReqResource are determined by invoking their respective compareAssignmentPriorities( ) methods (steps 17 and 18). At this point in time, one of the suitable candidates (i.e., Resource Groups) is selected as a supplier by invoking the assignsupplier( ) method (step 19) on the appropriate object, for this specific example, the aReqResource object. Once a supplier has been assigned, the corresponding user is assigned by invoking the assignUser( ) method on the aResourceGroup object (step 20). Next the assignSupplier( ) method is invoked on the aReqAssociation object (step 21) and on the anotherReqResource object (step 22). Again, with the supplier assigned, the user must also be assigned to the corresponding configuration item by invoking the assignUser( ) method on the appropriate object. For the simple example of FIG. 20, the assignUser( ) method on the aResourceGroup object is called (step 23) to assign anotherReqResource as a user of aResourceGroup.

As the example above illustrates, the framework provides an extremely flexible and powerful tool for implementing many different configuration environments by simply defining objects that implement the features specific to a particular configuration environment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier.

Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of object diagrams, and those skilled in the art will recognize that object diagrams and interaction diagrams are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system comprising:
   a central processing unit; and
   a main memory coupled to the central processing unit, the main memory containing an object-oriented framework mechanism that provides at least one configuration environment, the framework mechanism executing on the central processing unit, wherein the framework mechanism comprises a relationship generation class, the relationship generation class defining:
   at least one relationship generation object corresponding to the at least one configuration environment; and
   a first set of object methods to perform a plurality of predetermined functions to implement the configuration environment.

2. The computer system of claim 1 wherein the first set of object methods includes:
   at least one object method that creates at least one configuration item list, each configuration item list containing a plurality of configuration items, each configuration item corresponding to one of the plurality of items, each configuration item list corresponding to one configuration environment;
   at least one object method that establishes a plurality of possible relationships for the plurality of configuration items; and
   at least one object method that reports the plurality of possible relationships among the plurality of configuration items and creates a plurality of actual relationships based on the plurality of possible relationships.

3. The computer system of claim 1 wherein the relationship generation class is a core class of the framework mechanism that is defined by the framework mechanism to implement the at least one configuration environment.

4. The computer system of claim 1 wherein the framework mechanism further comprises a configuration item class, a configuration item list class, and an assignment controller class,
   the configuration item class defining:

a plurality of configuration item objects corresponding to the plurality of items; and
a second set of object methods for requesting that a required resource corresponding to one of the plurality of configuration objects report its relationship;
the configuration item list class defining:
at least one configuration item list object containing the plurality of configuration item objects; and
a third set of object methods for creating the plurality of configuration items and for reporting the relationship of each configuration item;
the assignment controller class defining:
at least one assignment controller object; and
a fourth set of object methods for establishing relationships between the plurality of configuration items.

5. The computer system of claim 4 wherein the framework mechanism further comprises an item class, a relationship class, and an item structure class,
the item class defining:
a plurality of item objects corresponding to the plurality of items;
the relationship class defining:
a plurality of relationship objects indicating relationships for a plurality of the item objects;
the item structure class defining:
at least one item structure object containing the plurality of item objects and the plurality of relationship objects; and
a fifth set of object methods to retrieve at least one of the plurality of items from the item structure object.

6. The computer system of claim 5 wherein the configuration item list class, the assignment controller class, the item class, the relationship class, and the item structure class are core classes of the framework mechanism, the implementation of which cannot be changed by a user.

7. The computer system of claim 5 wherein the framework mechanism further comprises a required resource class, the required resource class defining:
at least one required resource object; and
a sixth set of object methods for finding possible suppliers for the required resource object, for assigning one of the possible suppliers to the required resource object, for establishing and comparing assignment priority for the required resource object, and for reporting the relationship of the required resource object.

8. The computer system of claim 7 wherein the framework mechanism further comprises a resource class and a resource group class,
the resource class defining:
at least one resource object; and
a seventh set of object methods for checking the possible relationship of the resource object and for reporting the actual relationship of the resource object;
the resource group class defining:
at least one resource group object containing at least one resource object; and
an eighth set of object methods for adding possible users for the resource object, for assigning one of the possible users to the resource object, for checking a possible relationship for the resource object, and for reporting an assigned relationship of the resource object.

9. The computer system of claim 8 wherein the framework mechanism further comprises:
a required resource association class referencing a plurality of required resources, the required resource association class defining:
at least one required resource association object; and
a ninth set of object methods for finding possible suppliers for the required resources, for adding a possible supplier for the required resource, and for assigning one of the possible suppliers to the required resource.

10. The computer system of claim 9 wherein the framework mechanism further comprises:
a resource restriction class, the resource restriction class defining:
at least one resource restriction object; and
a tenth set of object methods for finding which of a plurality of possible relationships are valid relationships.

11. The computer system of claim 10 wherein the configuration item class, the required resource class, the resource class, the resource group class, the required resource association class, and the resource restriction class are extensible classes of the framework mechanism, the implementation of which by a user defines the at least one configuration environment.

12. The computer system of claim 10 wherein the relationship generation class has a "has by value" relationship with the item structure class, the configuration item list class, and the assignment controller class.

13. The computer system of claim 10 wherein the required resource class has a "has by value" relationship with the required resource association class and the resource restriction class.

14. The computer system of claim 10 wherein the resource group class has a "has by value" relationship with the resource class and the resource restriction class.

15. The computer system of claim 1 wherein the main memory contains an application program that supports an object oriented programming environment containing the framework mechanism, and wherein the framework mechanism is extended by providing information that implements the at least one configuration environment.

16. The computer system of claim 1 wherein the framework mechanism comprises:
at least one core function defined by at least one core class and by the relationships between a plurality of classes within the framework mechanism, wherein the implementation of the at least one core function is defined by the framework mechanism and cannot be modified by a user of the framework mechanism; and
at least one extensible function defined by at least one extensible class, wherein the implementation of the at least one extensible function is defined by the user of the framework mechanism by extending the at least one extensible class.

17. A computer system comprising:
a central processing unit; and
a main memory coupled to the central processing unit, the main memory containing an object-oriented framework mechanism that provides at least one configuration environment, the framework mechanism executing on the central processing unit, wherein the framework mechanism comprises an item class, a relationship class, and an item structure class,
the item class defining:
a plurality of item objects corresponding to the plurality of items; the relationship class defining:
a plurality of relationship objects indicating relationships for a plurality of the item objects;
the item structure class defining:

at least one item structure object containing the plurality of item objects and the plurality of relationship objects; and a fifth set of object methods to retrieve at least one of the plurality of items from the item structure object.

18. The computer system of claim 17 wherein the item class, the relationship class, and the item structure class are core classes of the framework mechanism that are defined by the framework mechanism to implement the at least one configuration environment.

19. A computer system comprising:

a central processing unit; and a main memory coupled to the central processing unit, the main memory containing an object-oriented framework mechanism that provides at least one configuration environment, the framework mechanism executing on the central processing unit, wherein the framework mechanism comprises a required resource class, the required resource class defining:

at least one required resource object; and a sixth set of object methods for finding possible suppliers for the required resource object, for assigning one of the possible suppliers to the required resource object, for establishing and comparing assignment priority for the required resource object, and for reporting the relationship of the required resource object.

20. A computer system comprising:

a central processing unit; and a main memory coupled to the central processing unit, the main memory containing an object-oriented framework mechanism that provides at least one configuration environment, the framework mechanism executing on the central processing unit, wherein the framework mechanism comprises a resource class and a resource group class, the resource class defining:

at least one resource object; and a seventh set of object methods for checking the possible relationship of the resource object and for reporting the actual relationship of the resource object;

the resource group class defining:

at least one resource group object containing at least one resource object; and an eighth set of object methods for adding possible users for the resource object, for assigning one of the possible users to the resource object, for checking a possible relationship for the resource object, and for reporting an assigned relationship of the resource object.

21. A computer system comprising:

a central processing unit; and a main memory coupled to the central processing unit, the main memory containing an object-oriented framework mechanism that provides at least one configuration environment, the framework mechanism executing on the central processing unit, wherein the framework mechanism comprises:

a required resource association class referencing a plurality of required resources, the required resource association class defining:

at least one required resource association object; and a ninth set of object methods for finding possible suppliers for the required resources, for adding a possible supplier for the required resource, and for assigning one of the possible suppliers to the required resource.

22. A computer system comprising:

a central processing unit; and a main memory coupled to the central processing unit, the main memory containing an object-oriented framework mechanism that provides at least one configuration environment, the framework mechanism executing on the central processing unit, wherein the framework mechanism comprises:

a resource restriction class, the resource restriction class defining:

at least one resource restriction object; and a tenth set of object methods for finding which of a plurality of possible relationships are valid relationships.

23. A method for determining configuration relations between a plurality of items, the method comprising the steps of:

providing an extensible object oriented framework mechanism that determines the configuration relations between the plurality of items according to extended portions of the framework mechanism that are customized to provide a desired configuration environment;

executing the object oriented framework mechanism on a computer system, the executing object oriented framework mechanism performing the steps of;

(a) checking possible relationships among the plurality of items, wherein some of the items are users and some of the items are suppliers;

(b) determining which of the items are possible suppliers;

(c) determining which of the items are possible users;

(d) assigning at least one supplier from the possible suppliers; and (e) assigning at least one user from the possible users.

24. The method of claim 23 further including the step of:

extending the framework mechanism to define the desired configuration environment.

25. The method of claim 23 further including the steps of:

(f) building a configuration item list from the plurality of items; and (g) reporting the relationships of the plurality of items.

26. The method of claim 25 wherein the step building the configuration item list includes the steps of:

creating an empty configuration item list object;

retrieving a plurality of the items; and creating a plurality of configuration item objects contained within the configuration item list object, each of the configuration item objects corresponding to one of the retrieved plurality of items.

27. The method of claim 25 wherein the step of reporting the relationships of the plurality of items includes the step of creating a relationship only if a supplier is matched to a user.

28. A program product comprising:

(A) an object-oriented framework mechanism for determining the configuration relations among a plurality of items, the framework mechanism including an extensible configuration relations mechanism that determines the configuration relations according to extended portions of the framework mechanism wherein the framework mechanism comprises:

at least one relationship generation object corresponding to the at least one configuration environment; and a first set of object methods to perform a plurality of predetermined functions to implement the configuration environment; and (B) signal bearing media bearing the framework mechanism.

29. The program product of claim 28 wherein the signal bearing media comprises recordable media.

30. The program product of claim 28 wherein the signal bearing media comprises transmission media.

31. The program product of claim 28 wherein the first set of object methods includes:
   at least one object method that creates at least one configuration item list, each configuration item list containing a plurality of configuration items, each configuration item corresponding to one of the plurality of items, each configuration item list corresponding to one configuration environment;
   at least one object method that establishes a plurality of possible relationships for the plurality of configuration items; and
   at least one object method that reports the plurality of possible relationships among the plurality of configuration items and creates a plurality of actual relationships based on the plurality of possible relationships.

32. A program product comprising:
   (A) an object-oriented framework mechanism for determining the configuration relations among a plurality of items, the framework mechanism including an extensible configuration relations mechanism that determines the configuration relations according to extended portions of the framework mechanism, wherein the framework mechanism comprises:
      a plurality of item objects corresponding to the plurality of items;
      a plurality of relationship objects indicating relationships for a plurality of the item objects;
      at least one item structure object containing the plurality of item objects and the plurality of relationship objects; and
      a fifth set of object methods to retrieve at least one of the plurality of items from the item structure object; and
   (B) signal bearing media bearing the framework mechanism.

33. A program product comprising:
   (A) an object-oriented framework mechanism for determining the configuration relations among a plurality of items, the framework mechanism including an extensible configuration relations mechanism that determines the configuration relations according to extended portions of the framework mechanism, wherein the framework mechanism comprises:
      at least one required resource object; and
      a sixth set of object methods for finding possible suppliers for the required resource object, for assigning one of the possible suppliers to the required resource object, for establishing and comparing assignment priority for the required resource object, and for reporting the relationship of the required resource object; and
   (B) signal bearing media bearing the framework mechanism.

34. A program product comprising:
   (A) an object-oriented framework mechanism for determining the configuration relations among a plurality of items, the framework mechanism including an extensible configuration relations mechanism that determines the configuration relations according to extended portions of the framework mechanism, wherein the framework mechanism comprises:
      at least one resource object; and
      a seventh set of object methods for checking the possible relationship of the resource object and for reporting the actual relationship of the resource object;
      at least one resource group object containing at least one resource object; and
      an eighth set of object methods for adding possible users for the resource object, for assigning one of the possible users to the resource object, for checking a possible relationship for the resource object, and for reporting an assigned relationship of the resource object; and
   (B) signal bearing media bearing the framework mechanism.

35. A program product comprising:
   (A) an object-oriented framework mechanism for determining the configuration relations among a plurality of items, the framework mechanism including an extensible configuration relations mechanism that determines the configuration relations according to extended portions of the framework mechanism, wherein the framework mechanism comprises:
      at least one required resource association object; and
      a ninth set of object methods for finding possible suppliers for a required resource, for adding a possible supplier for the required resource, and for assigning one of the possible suppliers to the required resource; and
   (B) signal bearing media bearing the framework mechanism.

36. A program product comprising:
   (A) an object-oriented framework mechanism for determining the configuration relations among a plurality of items, the framework mechanism including an extensible configuration relations mechanism that determines the configuration relations according to extended portions of the framework mechanism, wherein the framework mechanism comprises:
      at least one resource restriction object; and
      a tenth set of object methods for finding which of a plurality of possible relationships are valid relationships; and
   (B) signal bearing media bearing the framework mechanism.

37. A program product comprising:
   (A) an object-oriented framework mechanism for determining the configuration relations among a plurality of items, the framework mechanism including an extensible configuration relations mechanism that determines the configuration relations according to extended portions of the framework mechanism, wherein the framework mechanism comprises:
      a plurality of configuration item objects corresponding to the plurality of items;
      a second set of object methods for requesting that a required resource corresponding to one of the plurality of configuration objects report its relationship;
      at least one configuration item list object containing the plurality of configuration item objects;
      a third set of object methods for creating the plurality of configuration items and for reporting the relationship of each configuration item;
      at least one assignment controller object; and
      a fourth set of object methods for establishing relationships between the plurality of configuration items; and (B) signal bearing media bearing the framework mechanism.

38. A method for determining configuration relations for a plurality of items, the method comprising the steps of:

(A) providing a relationship generation object corresponding to the at least one configuration environment, the relationship generation object including a first set of object methods to perform a plurality of predetermined functions to implement the configuration environment;

(B) providing a plurality of configuration item objects corresponding to the plurality of items;

(C) providing a second set of object methods for requesting that a required resource corresponding to one of the plurality of configuration objects report its relationship;

(D) providing at least one configuration item list object containing the plurality of configuration item objects;

(E) providing a third set of object methods for creating the plurality of configuration items and for reporting the relationship of each configuration item;

(F) providing at least one assignment controller object;

(G) providing a fourth set of object methods for establishing relationships between the plurality of configuration items;

(H) providing a plurality of item objects corresponding to the plurality of items;

(I) providing a plurality of relationship objects indicating relationships for a plurality of the item objects;

(J) providing at least one item structure object containing the plurality of item objects and the plurality of relationship objects;

(K) providing a fifth set of object methods to retrieve at least one of the plurality of items from the item structure object;

(L) providing at least one required resource object;

(M) providing a sixth set of object methods for finding possible suppliers for the required resource object, for assigning one of the possible suppliers to the required resource object, for establishing and comparing assignment priority for the required resource object, and for reporting the relationship of the required resource object;

(N) providing at least one resource object;

(O) providing a seventh set of object methods for checking the possible relationship of the resource object and for reporting the actual relationship of the resource object;

(P) providing at least one resource group object containing at least one resource object;

(Q) providing an eighth set of object methods for adding possible users for the resource object, for assigning one of the possible users to the resource object, for checking a possible relationship for the resource object, and for reporting an assigned relationship of the resource object;

(R) providing at least one required resource association object;

(S) providing a ninth set of object methods for finding possible suppliers for a required resource, for adding a possible supplier for the required resource, and for assigning one of the possible suppliers to the required resource;

(T) providing at least one resource restriction object;

(U) a tenth set of object methods for finding which of a plurality of possible relationships are valid relationships; and (V) executing the object oriented framework mechanism on a computer system to determine the configuration relations of the plurality of items.

39. The method of claim 38 further including the step of: extending the framework mechanism to define the desired configuration environment.

40. A program product comprising:

(A) an object oriented framework mechanism for determining configuration relations for a plurality of items in at least one configuration environment, the framework mechanism including a relationship generation object corresponding to the at least one configuration environment, the relationship generation object including a first set of object methods to perform a plurality of predetermined functions to implement the configuration environment, the framework mechanism further including a plurality of configuration item objects corresponding to the plurality of items, the configuration item objects including a second set of object methods for requesting that a required resource corresponding to one of the plurality of configuration objects report its relationship, the framework mechanism further including at least one configuration item list object containing the plurality of configuration item objects, each configuration item list object including a third set of object methods for creating the plurality of configuration items and for reporting the relationship of each configuration item, the framework mechanism further including at least one assignment controller object, the assignment controller object including a fourth set of object methods for establishing relationships between the plurality of configuration items, the framework mechanism further including a plurality of item objects corresponding to the plurality of items, the plurality of item objects including a plurality of relationship objects indicating relationships for a plurality of the item objects, the framework mechanism further including at least one item structure object containing the plurality of item objects and the plurality of relationship objects, the item structure object including a fifth set of object methods to retrieve at least one of the plurality of items from the item structure object, the framework mechanism further including at least one required resource object, the required resource object including a sixth set of object methods for finding possible suppliers for the required resource object, for assigning one of the possible suppliers to the required resource object, for establishing and comparing assignment priority for the required resource object, and for reporting the relationship of the required resource object, the framework mechanism further including at least one resource object, the resource object including a seventh set of object methods for checking the possible relationship of the resource object and for reporting the actual relationship of the resource object, the framework mechanism further including at least one resource group object containing at least one resource object, the resource group object including an eighth set of object methods for adding possible users for the resource object, for assigning one of the possible users to the resource object, for checking a possible relationship for the resource object, and for reporting an assigned relationship of the resource object, the framework mechanism further including at least one required resource association object, the required resource association object including a ninth set of object methods for finding possible suppliers for a required resource, for adding a possible supplier for the required resource, and for assigning one of the possible suppliers to the required resource, the framework mechanism further including at least one resource restriction object, the resource restriction object including a tenth set of object methods for finding which of a plurality of possible relationships are valid relationships; and (B) signal bearing media bearing the object oriented framework mechanism.

41. The program product of claim 40 wherein the signal bearing media comprises recordable media.

42. The program product of claim 40 wherein the signal bearing media comprises transmission media.

43. The program product of claim 40 wherein the configuration item list object, the assignment controller object, the item object, the relationship object, and the item structure object with their associated methods comprise a core function of the framework mechanism, the implementation of which cannot be changed by a user.

44. The program product of claim 43 wherein the configuration item object, the required resource object, the resource object, the resource group object, the required resource association object, and the resource restriction object comprise an extensible function of the framework mechanism, the implementation of which by a user defines the at least one configuration environment.

45. An object oriented framework mechanism that determines configuration relations for a plurality of items, the framework mechanism comprising:

at least one core function defined by relationships between a plurality of classes within the framework mechanism, wherein the implementation of the at least one core function is defined by the framework mechanism and cannot be modified by a user of the framework mechanism;

at least one extensible class wherein the implementation of the at least one extensible class is defined by the user of the framework mechanism, by extending the at least one extensible class, thereby defining at least one configuration environment;

a relationship generation object corresponding to the at least one configuration environment, the relationship generation object including a first set of object methods to perform a plurality of predetermined functions to implement the configuration environment;

a plurality of configuration item objects corresponding to the plurality of items;

a second set of object methods for requesting that a required resource corresponding to one of the plurality of configuration objects report its relationship;

at least one configuration item list object containing the plurality of configuration item objects;

a third set of object methods for creating the plurality of configuration items and for reporting the relationship of each configuration item;

at least one assignment controller object;

a fourth set of object methods for establishing relationships between the plurality of configuration items;

a plurality of item objects corresponding to the plurality of items;

a plurality of relationship objects indicating relationships for a plurality of the item objects;

at least one item structure object containing the plurality of item objects and the plurality of relationship objects;

a fifth set of object methods to retrieve at least one of the plurality of items from the item structure object;

at least one required resource object;

a sixth set of object methods for finding possible suppliers for the required resource object, for assigning one of the possible suppliers to the required resource object, for establishing and comparing assignment priority for the required resource object, and for reporting the relationship of the required resource object;

at least one resource object;

a seventh set of object methods for checking the possible relationship of the resource object and for reporting the actual relationship of the resource object;

at least one resource group object containing at least one resource object;

an eighth set of object methods for adding possible users for the resource object, for assigning one of the possible users to the resource object, for checking a possible relationship for the resource object, and for reporting an assigned relationship of the resource object;

at least one required resource association object;

a ninth set of object methods for finding possible suppliers for a required resource, for adding a possible supplier for the required resource, and for assigning one of the possible suppliers to the required resource;

at least one resource restriction object; and a tenth set of object methods for finding which of a plurality of possible relationships are valid relationships.

46. A method for determining configuration relations for a plurality of items using a computer system having a central processing unit and a main memory, the main memory having an application program that provides an object oriented programming environment, the method comprising the steps of:

(A) providing in the program an object oriented framework mechanism that determines the configuration relations according to extended portions of the framework mechanism that are customized to provide a desired configuration environment, the framework mechanism including:

a set of core functions wherein the implementation of the core functions is defined by the framework mechanism and cannot be modified by a user of the framework mechanism; and a set of extensible functions wherein the implementation of the extensible functions is defined by the user of the framework mechanism;

(B) extending the extensible functions in the framework mechanism to define particular classes having predetermined protocols and defining particular object methods that determine the configuration relations, the extensible functions defining the desired configuration environment;

(C) generating an executable configuration relations system by integrating together the extensible functions and the core functions; and (D) executing the executable configuration relations system on the computer system to determine the configuration relations.

47. The method of claim 46 further including the steps of:

(E) checking possible relationships among the plurality of items, wherein some of the items are users and some of the items are suppliers;

(F) determining which of the items are possible suppliers;

(G) determining which of the items are possible users;

(H) assigning at least one supplier from the possible suppliers; and (I) assigning at least one user from the possible users.

48. The method of claim 47 further including the steps of:

(J) building a configuration item list from the plurality of items; and (K) reporting the relationships of the plurality of items.

49. The method of claim 48 wherein the step building the configuration item list includes the steps of:

creating an empty configuration item list object;

retrieving a plurality of the items; and creating a plurality of configuration item objects contained within the configuration item list object, each of the configuration item objects corresponding to one of the retrieved plurality of items.

50. The method of claim 49 wherein the step of reporting the relationships of the plurality of items includes the step of creating a relationship only if a supplier is matched to a user.

51. A program product comprising:

an object oriented framework mechanism for determining configuration relations for a plurality of items, the framework mechanism including at least one core function defined by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining a configuration environment that governs the operation of the framework mechanism; and signal bearing media bearing the object oriented framework mechanism.

52. The program product of claim 51 wherein the signal bearing media comprises recordable media.

53. The program product of claim 51 wherein the signal bearing media comprises transmission media.

54. The program product of claim 51 wherein the framework mechanism comprises:

a relationship generation object corresponding to the at least one configuration environment, the relationship generation object including a first set of object methods to perform a plurality of predetermined functions to implement the configuration environment;

a plurality of configuration item objects corresponding to the plurality of items;

a second set of object methods for requesting that a required resource corresponding to one of the plurality of configuration objects report its relationship;

at least one configuration item list object containing the plurality of configuration item objects;

a third set of object methods for creating the plurality of configuration items and for reporting the relationship of each configuration item;

at least one assignment controller object;

a fourth set of object methods for establishing relationships between the plurality of configuration items;

a plurality of item objects corresponding to the plurality of items;

a plurality of relationship objects indicating relationships for a plurality of the item objects;

at least one item structure object containing the plurality of item objects and the plurality of relationship objects;

a fifth set of object methods to retrieve at least one of the plurality of items from the item structure object;

at least one required resource object;

a sixth set of object methods for finding possible suppliers for the required resource object, for assigning one of the possible suppliers to the required resource object, for establishing and comparing assignment priority for the required resource object, and for reporting the relationship of the required resource object;

at least one resource object;

a seventh set of object methods for checking the possible relationship of the resource object and for reporting the actual relationship of the resource object;

at least one resource group object containing at least one resource object;

an eighth set of object methods for adding possible users for the resource object, for assigning one of the possible users to the resource object, for checking a possible relationship for the resource object, and for reporting an assigned relationship of the resource object;

at least one required resource association object;

a ninth set of object methods for finding possible suppliers for a required resource, for adding a possible supplier for the required resource, and for assigning one of the possible suppliers to the required resource;

at least one resource restriction object;

a tenth set of object methods for finding which of a plurality of possible relationships are valid relationships;

wherein the object oriented framework mechanism determines the configuration relations according to extended portions of the framework mechanism that are customized to provide a desired configuration environment.

* * * * *